US008401283B2

(12) United States Patent
Sabe et al.

(10) Patent No.: US 8,401,283 B2
(45) Date of Patent: Mar. 19, 2013

(54) INFORMATION PROCESSING APPARATUS, INFORMATION PROCESSING METHOD, AND PROGRAM

(75) Inventors: Kohtaro Sabe, Tokyo (JP); Atsushi Okubo, Tokyo (JP); Kenichi Hidai, Tokyo (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/816,779

(22) Filed: Jun. 16, 2010

(65) Prior Publication Data
US 2010/0329544 A1 Dec. 30, 2010

(30) Foreign Application Priority Data
Jun. 30, 2009 (JP) ................................. 2009-154925

(51) Int. Cl.
G06K 9/00 (2006.01)

(52) U.S. Cl. ..................................................... 382/159

(58) Field of Classification Search .................. 382/100, 382/103–104, 107, 115–116, 118, 155, 159, 382/162, 165, 170, 173, 181, 224, 225, 227; 348/208.13–208.14, 77, 143, 152, 161; 701/400; 706/12, 20–21, 45, 47; 707/737, 755, 796
See application file for complete search history.

(56) References Cited

U.S. PATENT DOCUMENTS

| 7,545,985 | B2 * | 6/2009 | Zhang et al. | 382/224 |
| 7,590,267 | B2 * | 9/2009 | Xiao et al. | 382/118 |
| 7,643,659 | B2 * | 1/2010 | Cao et al. | 382/118 |
| 7,724,962 | B2 * | 5/2010 | Zhu et al. | 382/225 |
| 7,840,061 | B2 * | 11/2010 | Porikli et al. | 382/159 |
| 7,840,502 | B2 * | 11/2010 | Li et al. | 706/12 |
| 7,848,566 | B2 * | 12/2010 | Schneiderman | 382/159 |
| 7,853,071 | B2 * | 12/2010 | Friedhoff et al. | 382/155 |
| 7,961,937 | B2 * | 6/2011 | Luo | 382/159 |
| 7,986,828 | B2 * | 7/2011 | Rao et al. | 382/159 |

FOREIGN PATENT DOCUMENTS

EP  1 536 369 A1  6/2005

OTHER PUBLICATIONS

European Search Report issued Oct. 26, 2010, in Application No./ Patent No. 10167023.0-1224.
Terry Windeatt, et al., "Ensemble Approaches to Facial Action Unit Classification", Progress in Pattern Recognition, Image Analysis and Applications, Springer Berlin, XP019110943, Sep. 9, 2008, pp. 551-559.

(Continued)

Primary Examiner — Jose Couso
(74) Attorney, Agent, or Firm — Oblon, Spivak, McClelland, Maier & Neustadt, L.L.P.

(57) ABSTRACT

An information processing apparatus includes the following elements. A learning unit is configured to perform Adaptive Boosting Error Correcting Output Coding learning using image feature values of a plurality of sample images each being assigned a class label to generate a multi-class classifier configured to output a multi-dimensional score vector corresponding to an input image. A registration unit is configured to input a register image to the multi-class classifier, and to register a multi-dimensional score vector corresponding to the input register image in association with identification information about the register image. A determination unit is configured to input an identification image to be identified to the multi-class classifier, and to determine a similarity between a multi-dimensional score vector corresponding to the input identification image and the registered multi-dimensional score vector corresponding to the register image.

9 Claims, 18 Drawing Sheets

OTHER PUBLICATIONS

J. Kittler, et al., "Face Verification Using Error Correcting Output Codes", vol. 1, Proceedings IEEE Conference on Computer Vision and Pattern Recognition, XP10583821A, Dec. 8, 2001, pp. I-755-I-760.

Jie Zou, et al., "A Comparative Study of Local Matching Approach for Face Recognition", vol. 16, No. 10, IEEE Transactions on Image Processing, XP011192119A, Oct. 1, 2007, pp. 2617-2628.

Jun Gao, et al., "Generic object recognition with regional statistical models and layer joint boosting", vol. 28, No. 16, Pattern Recognition Letters, Elsevier, XP22293675A, Oct. 11, 2007, pp. 2227-2237.

Thomas G. Dietterich, et al., "Solving Multiclass Learning Problems via Error-Correcting Output Codes," Journal of Artificial Intelligence Research 2, 1995, pp. 263-286.

Robert E. Schapire, "Using output codes to boost multiclass learning problems," Machine Learning: Proceedings of the Fourteenth International Conference, 1997, pp. 1-9.

T. Windeatt, et al., "Boosted ECOC Ensembles for Face Recognition," International Conference on Visual Information Engineering, 2003(VIE 2003), Jul. 7-9, 2003, pp. 165-168.

* cited by examiner

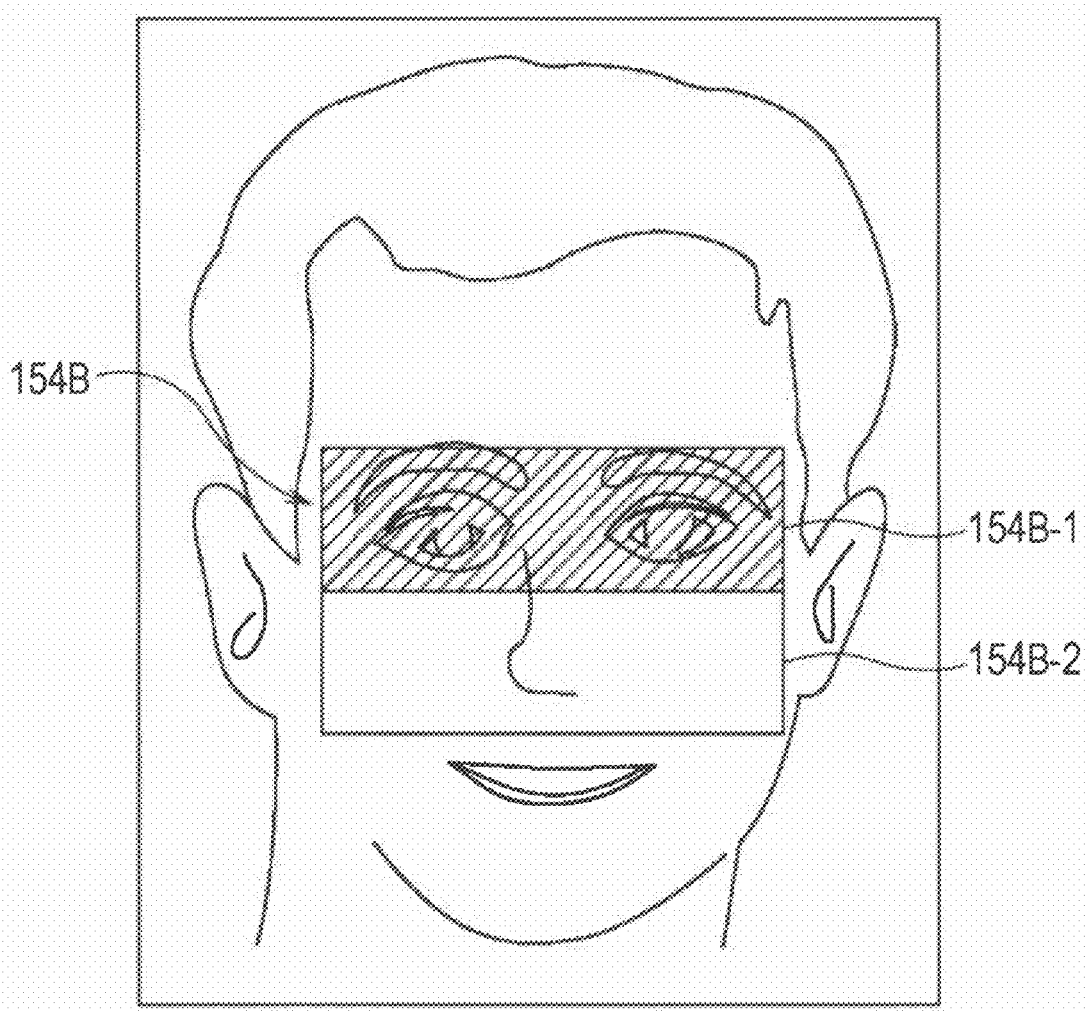

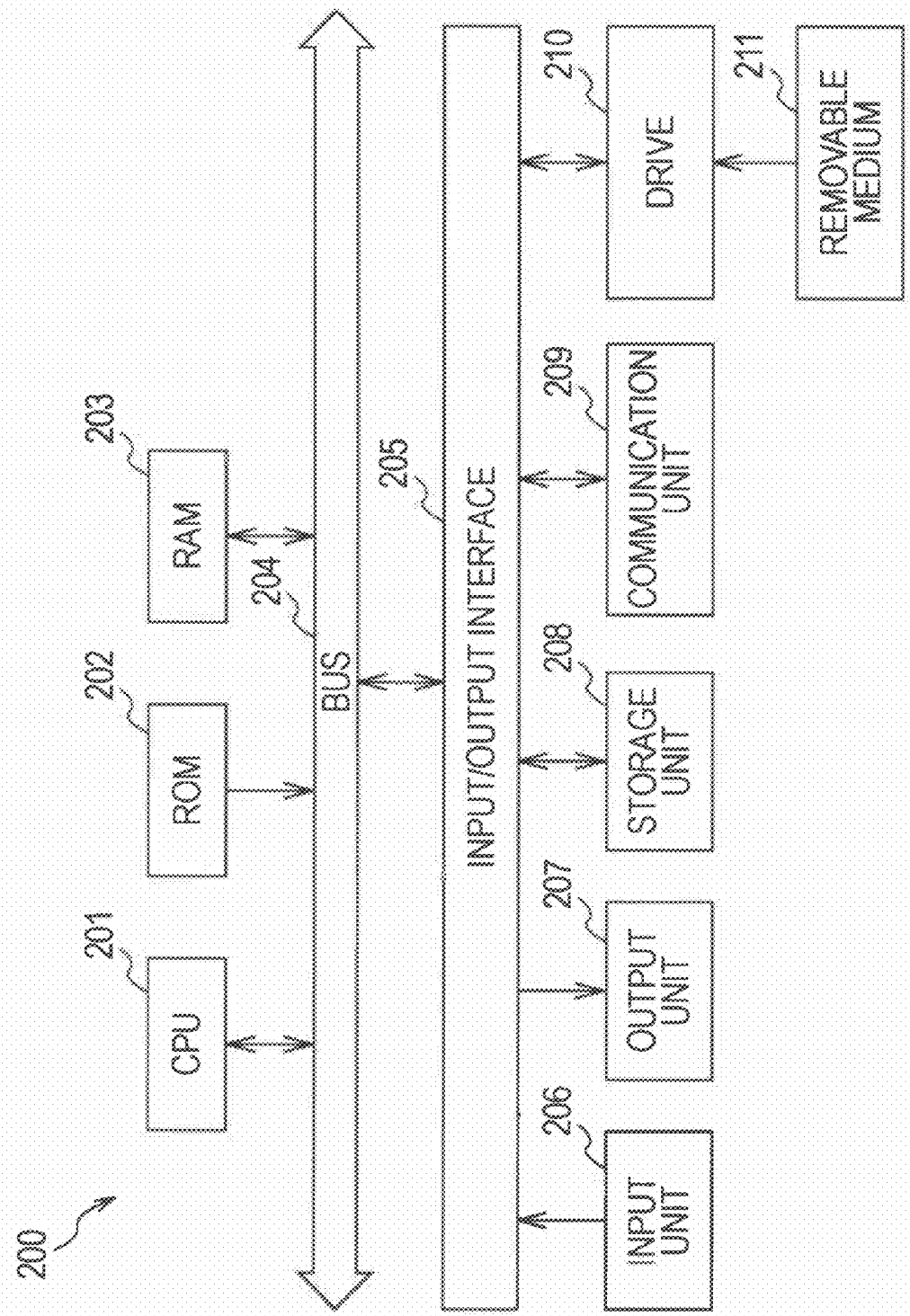

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. More specifically, the present invention relates to an information processing apparatus, an information processing method, and a program suitable for use in, for example, the personal identification of an individual that is the subject in a face image.

2. Description of the Related Art

Statistical learning methods have been used in the stage of learning in image recognition. Boosting, which is a learning technique based on statistical learning theory, can be used to construct high-accuracy classifiers capable of efficiently selecting feature values from voluminous data.

Classification of image recognition is generally formulated as a two-class separation problem of determining whether or not an image to be recognized matches a pre-learned image, and a great number of techniques for extending the classification to multi-class classification have been proposed.

For example, an application of Error-Correcting Output Coding (ECOC) used in the communication field, in which multiple classes are represented using binary numbers by repeating binary classification and are classified, is described in Thomas G. Dietterich and Ghulum Bakiri, "Solving Multiclass Learning Problems via Error-Correcting Output Codes", Journal of Artificial Intelligence Research 2, pp. 263-286, 1995.

Further, for example, a mechanism in which the above ECOC method is applied to a boosting algorithm so that weak classifiers used for binary classification are combined to construct a multi-class classifier is described in Robert E. Shapire, "Using output codes to boost multiclass learning problems", Proceedings of the Fourteenth International Conference on Machine Learning 1997.

Further, for example, it is described in T. Windeatt and G. Ardeshir, "Boosted ECOC Ensembles for Face Recognition", International Conference on Visual Information Engineering, 2003 (VIE 2003), Volume, Issue, 7-9 Jul. 2003 pp. 165-168 that an extension of Adaptive Boosting (AdaBoost), which is a boosting algorithm, to a multi-class approach, i.e., Output-Code AdaBoost (AdaBoost.OC), is used for tasks for personal identification based on face images. Specifically, predetermined training images of 200 registered persons are used in the learning of a multi-class classifier. Face images of the same 200 persons are input to the multi-class classifier to evaluate to which class each face image belongs (that is, to which person out of the 200 registered persons each face image belongs).

SUMMARY OF THE INVENTION

However, the multi-class classifier described in T. Windeatt and G. Ardeshir does not guarantee evaluation of face images of unknown persons (that is, persons other than the 200 registered persons), and a satisfactory result is not obtained in the task of verification using a face image of an unregistered impostor.

It is therefore desirable to identify even an unknown image by applying a multi-class classification result to the unknown image.

According to an embodiment of the present invention, an information processing apparatus includes the following elements. Learning means performs Adaptive Boosting Error Correcting Output Coding learning using image feature values of a plurality of sample images each being assigned a class label to generate a multi-class classifier configured to output a multi-dimensional score vector corresponding to an input image. Registration means inputs a register image to the multi-class classifier, and registers a multi-dimensional score vector corresponding to the input register image in association with identification information about the register image. Determination means inputs an identification image to be identified to the multi-class classifier, and determines a similarity between a multi-dimensional score vector corresponding to the input identification image and the registered multi-dimensional score vector corresponding to the register image.

The learning means may perform Adaptive Boosting Error Correcting Output Coding learning using image feature values of a plurality of sample images each being assigned one of K class labels to generate an entire-image multi-class classifier configured to output a K-dimensional score vector corresponding to an input image, and may perform independent Adaptive Boosting Error Correcting Output Coding learning using an image feature value of each of segment images obtained by dividing each of the sample images into M parts to generate M part-based multi-class classifiers each configured to output a K-dimensional score vector corresponding to the input image.

Each of the class labels may include at least one of identification information for identifying an individual subject in a corresponding one of the sample images and attribute information indicating an attribute of a subject in the corresponding one of the sample images.

The information processing apparatus may further include reduction means for selectively reducing dimensionality of the multi-class classifier.

The reduction means may selectively reduce dimensionality of the multi-class classifier using sequential search.

The reduction means may selectively reduce dimensionality of the multi-class classifier in accordance with a Boosting learning result of a lower classifier that is provided after the multi-class classifier and that is configured to receive an output of the multi-class classifier.

The image feature values may be pixel difference features or rectangle features.

According to another embodiment of the present invention, an information processing method is an information processing method for an information processing apparatus that identifies an input image, including the steps of performing Adaptive Boosting Error Correcting Output Coding learning using image feature values of a plurality of sample images each being assigned a class label to generate a multi-class classifier configured to output a multi-dimensional score vector corresponding to the input image; inputting a register image to the multi-class classifier, and registering a multi-dimensional score vector corresponding to the input register image in association with identification information about the register image; and inputting an identification image to be identified to the multi-class classifier, and determining a similarity between a multi-dimensional score vector corresponding to the input identification image and the registered multi-dimensional score vector corresponding to the register image.

According to still another embodiment of the present invention, a program causes a computer to function as learning means for performing Adaptive Boosting Error Correcting Output Coding learning using image feature values of a plurality of sample images each being assigned a class label to generate a multi-class classifier configured to output a multi-dimensional score vector corresponding to an input image; registration means for inputting a register image to the multi-class classifier, and registering a multi-dimensional score vector corresponding to the input register image in association with identification information about the register image; and determination means for inputting an identification image to be identified to the multi-class classifier, and determining a similarity between a multi-dimensional score vector corresponding to the input identification image and the registered multi-dimensional score vector corresponding to the register image.

According to an embodiment of the present invention, Adaptive Boosting Error Correcting Output Coding learning is performed using image feature values of a plurality of sample images each being assigned a class label to generate a multi-class classifier configured to output a multi-dimensional score vector corresponding to the input image. Further, a register image is input to the multi-class classifier, and a multi-dimensional score vector corresponding to the input register image is registered in association with identification information about the register image. Furthermore, an identification image to be identified is input to the multi-class classifier, and a similarity between a multi-dimensional score vector corresponding to the input identification image and the registered multi-dimensional score vector corresponding to the register image is determined.

Therefore, an unknown image can be identified.

BRIEF DESCRIPTION OF THE DRAWINGS

FIG. 18 is a diagram illustrating a rectangle feature serving as an image feature value; and FIG. 19 is block diagram illustrating an example configuration of a computer.

DESCRIPTION OF THE PREFERRED EMBODIMENTS

An embodiment of the present invention will now be described in detail with reference to the drawings. The description will be given in the following order:
1. Overview of Operation of Face Image Identification Apparatus according to Embodiment
2. Example Configuration of Face Image Identification Apparatus according to Embodiment
3. Operation of Face Image Identification Apparatus according to Embodiment
4. Component-based Multi-Class Classifiers
5. Another Example of Class Labels
6. Selection of Dimension of Feature Values
7. Layered Classifiers
8. Other Image Feature Values
1. Overview of Operation of Face Image Identification Apparatus According to Embodiment A face image identification apparatus according to the embodiment is configured to determine a feature value of a face image to be identified, compare the determined feature value with feature values of face images of a plurality of persons registered in advance (registered persons), and output identification information (such as name) about one of the registered persons who has the most similar feature value as an identification result.

The operation of the face image identification apparatus is broadly separated into three processes: learning, registration, and identification.

Figure 1:
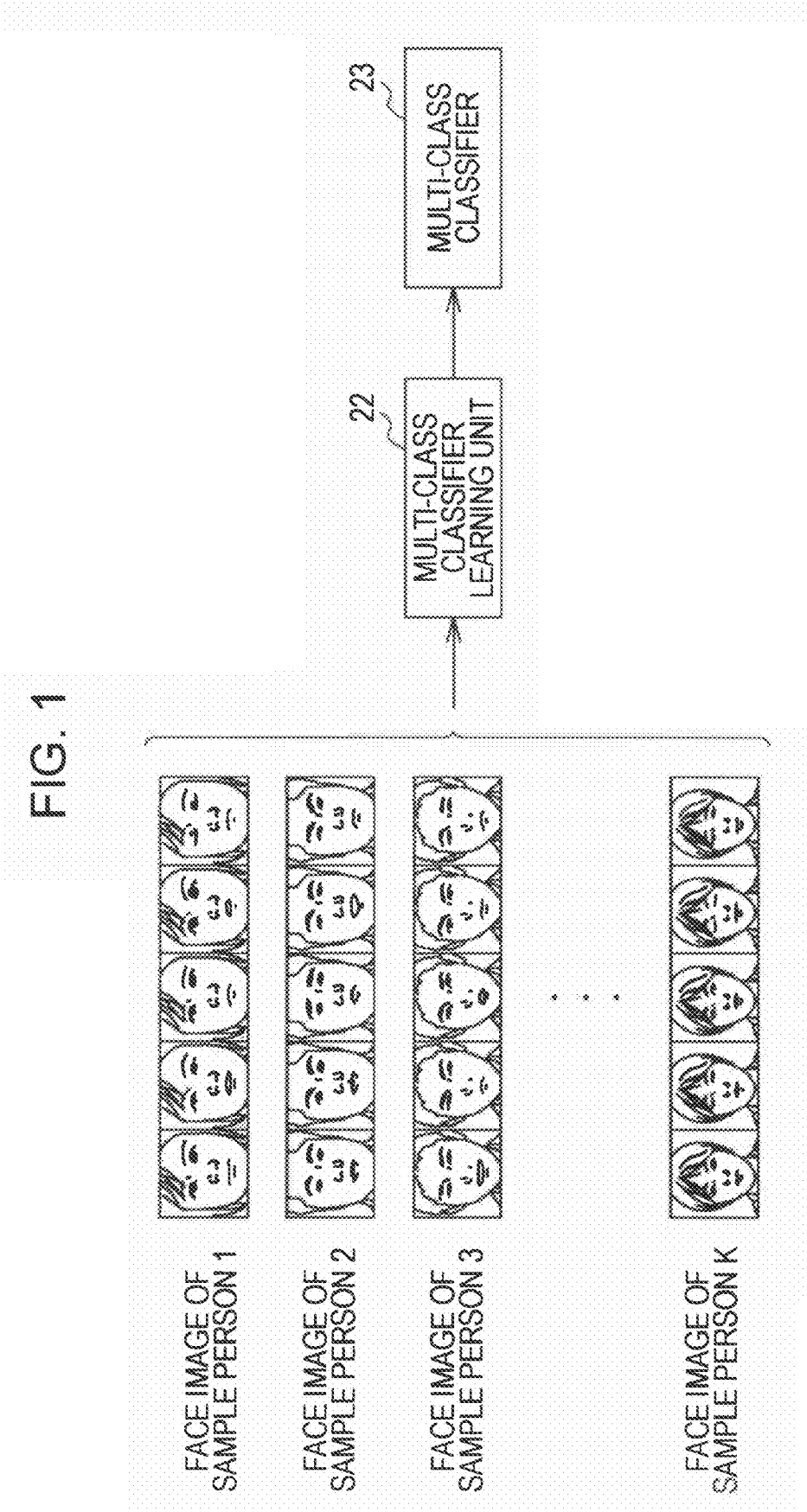
FIG. 1 is a diagram illustrating an overview of a learning process of a face image identification apparatus according to an embodiment of the present invention.

FIG. 1 illustrates an overview of the learning process. In the learning process, a plurality of face images are provided for each of K sample persons. A multi-class classifier learning unit 22 calculates image feature values of the face images of each of the sample persons k (k=1, 2, ..., K), and learns a multi-class classifier 23 using the resulting image feature values. The multi-class classifier 23 determines a score indicating the degree to which a person in an input face image is similar to each of the sample persons k. It is assumed that the larger the score, the higher the similarity. Thus, the multi-class classifier 23 outputs scores of K dimensions (hereinafter referred to as "K-dimensional score vectors").

Figure 2:
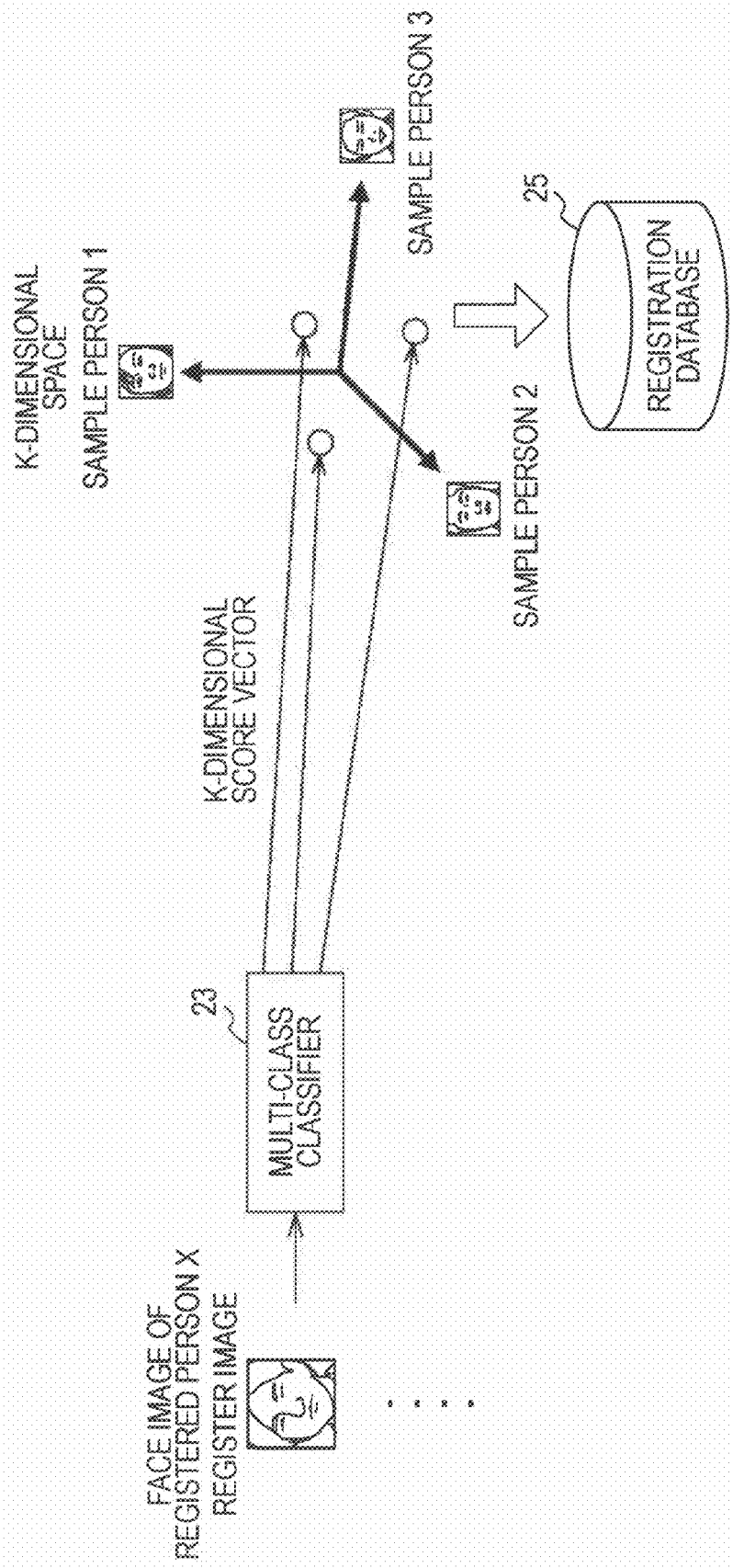
FIG. 2 is a diagram illustrating an overview of a registration process of the face image identification apparatus according to the embodiment of the present invention.

FIG. 2 illustrates an overview of the registration process. In the registration process, a face image is provided for each of a plurality of registered persons X, Y, Z, ..., and the multi-class classifier 23 determines a K-dimensional score vector for a face image of each of the registered persons. The determined K-dimensional score vectors are registered in a registration database 25 in association with identification information (such as name) about the registered persons. The registered persons are not related to (that is, are different from) the sample persons in the learning process but may be the same as the sample persons.

Figure 3:
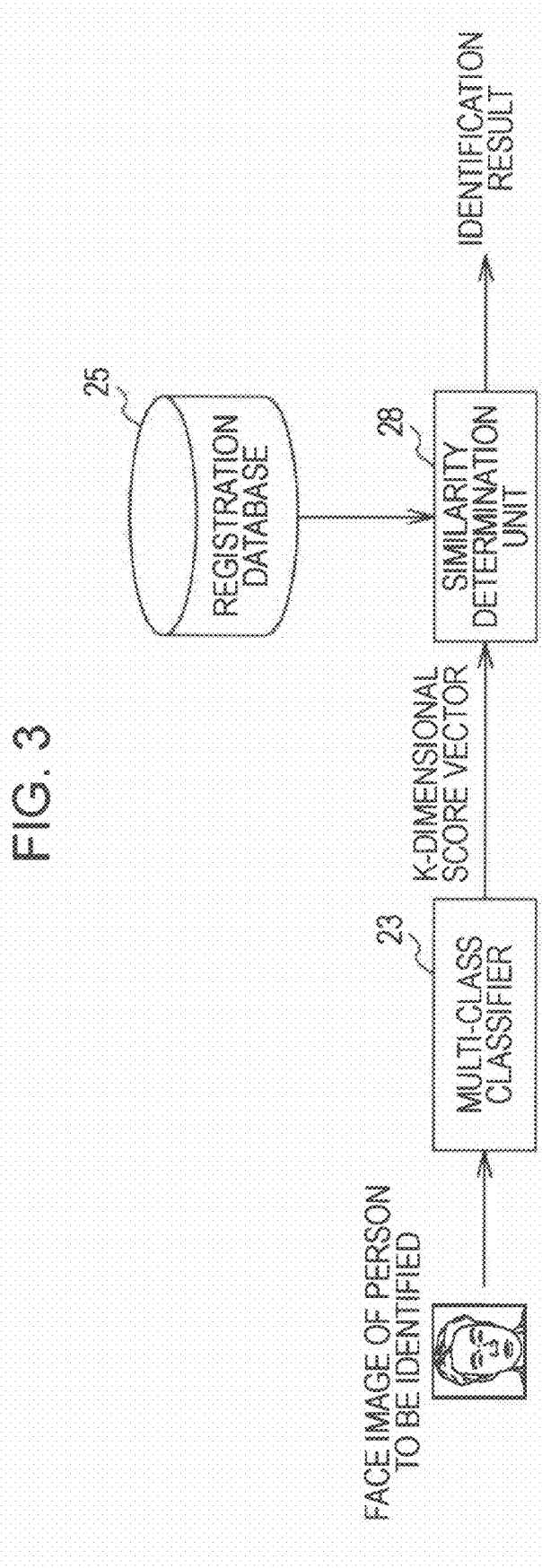
FIG. 3 is a diagram illustrating an overview of an identification process of the face image identification apparatus according to the embodiment of the present invention.

FIG. 3 illustrates an overview of the identification process. In the identification process, a face image to be identified is provided, and the multi-class classifier 23 determines a K-dimensional score vector of the face image to be identified and inputs the K-dimensional score vector to a similarity determination unit 28. The similarity determination unit 28 specifies the K-dimensional score vector that is the most similar to the K-dimensional score vector of the face image to be identified among the K-dimensional score vectors registered in the registration database 25, and outputs identification information about the corresponding one of the registered persons as an identification result. The similarity between K-dimensional score vectors is measured by, for example, Euclidean distance.

Figure 4:
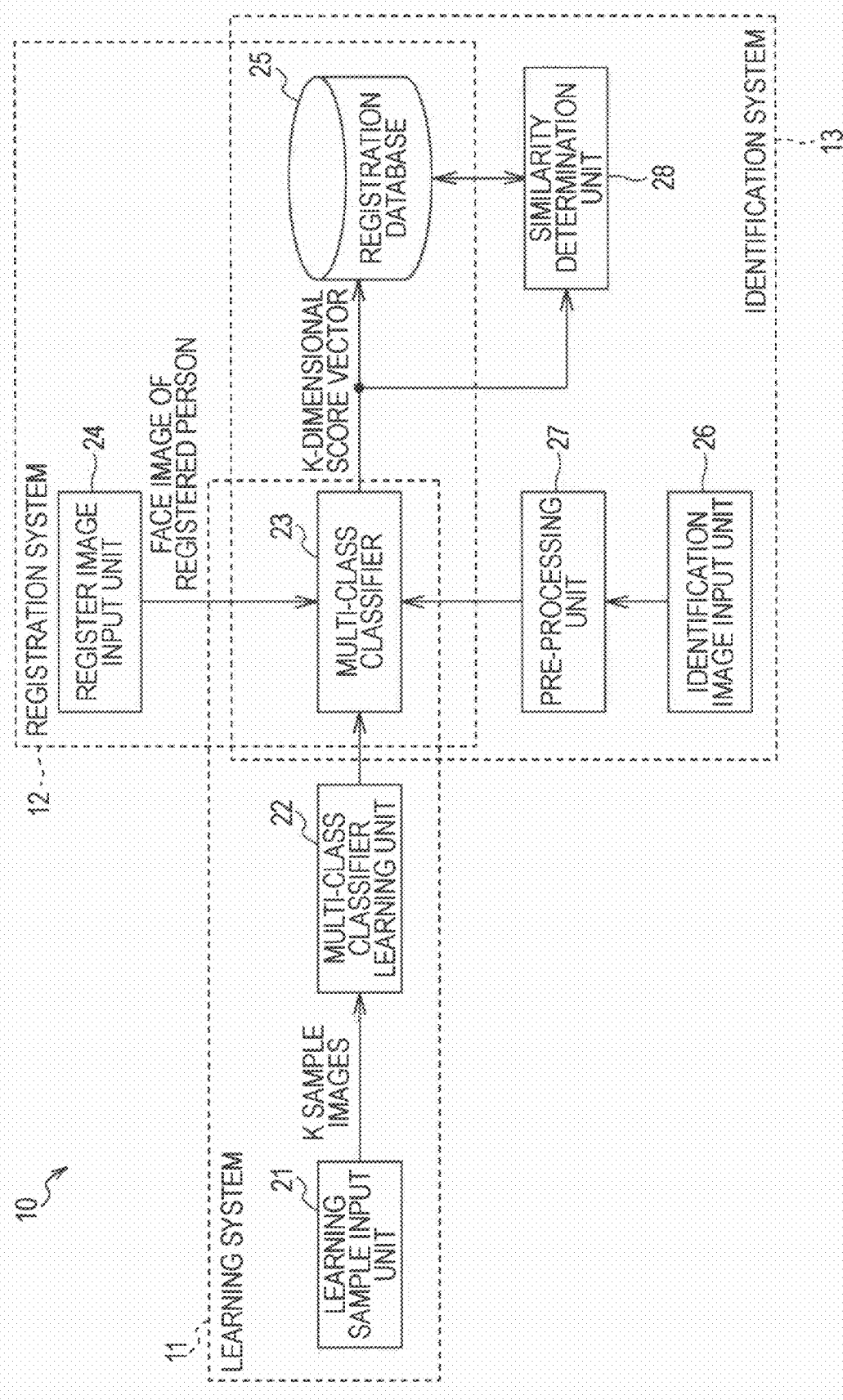
FIG. 4 is a block diagram illustrating an example configuration of the face image identification apparatus according to the embodiment of the present invention.

2. Example Configuration of Face Image Identification Apparatus According to Embodiment FIG. 4 illustrates an example configuration of the face image identification apparatus according to the embodiment. A face image identification apparatus 10 includes a learning system 11 configured to perform the learning process, a registration system 12 configured to perform the registration process, and an identification system 13 configured to perform the identification process.

The learning system 11 includes a learning sample input unit 21, the multi-class classifier learning unit 22, and the multi-class classifier 23. The registration system 12 includes the multi-class classifier 23, a register image input unit 24, and the registration database 25. The identification system 13 includes the multi-class classifier 23, the registration database 25, an identification image input unit 26, a pre-processing unit 27, and the similarity determination unit 28. That is, the multi-class classifier 23 is included in the learning system 11, the registration system 12, and the identification system 13, and the registration database 25 is included in the registration system 12 and the identification system 13.

Figure 5:
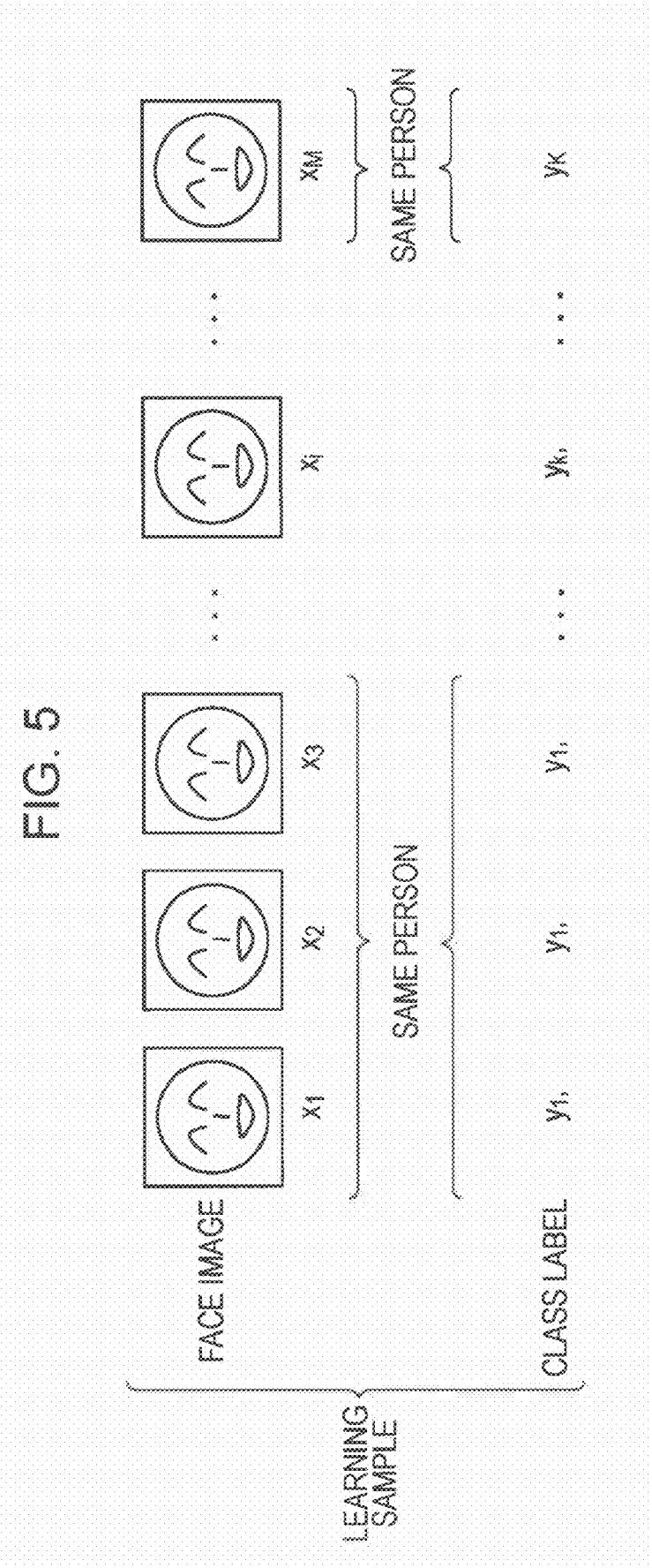
FIG. 5 is a diagram illustrating an example of sample images.

The learning sample input unit 21 adds, as a class label, identification information (for example, name) about each of the K sample persons to a plurality of face images (also referred to as "sample images") provided for the corresponding one of the K sample persons, and supplies learning samples each including a sample image $x_i$ and a class label $y_k$ to the multi-class classifier learning unit 22. More specifically, as illustrated in FIG. 5, class labels $y_k$ (k=1, 2, ..., K) are added to M sample images $x_i$ (i=1, 2, ..., M) to produce M learning samples ($x_i$, $y_k$) which are input to the multi-class classifier learning unit 22.

The learning sample input unit 21 resizes the sample images $x_i$ to a predetermined size (described in detail below) before inputting the sample images $x_i$ to the multi-class classifier learning unit 22.

The multi-class classifier learning unit 22 determines image feature values of the M sample images $x_i$ with the added class labels $y_k$, and learns a plurality of weak classifiers using AdaBoost ECOC to generate the multi-class classifier 23 formed of the plurality of weak classifiers. The determination of the plurality of weak classifiers each configured to determine whether or not an image belongs to a class is based on the image feature values of sample images. Examples of the image feature values may include PixDif Feature (pixel difference feature), which is proposed by the inventors of the present invention.

PixDif Feature (pixel difference feature) is disclosed in, for example, Sabe, Hidai, "pikuseru sabun tokucho wo mochiita jitsujikan nin'i shisei kao kenshutsuki no gakushu (Learning of a Real-Time Arbitrary Posture Face Detector Using Pixel Difference Feature)", Proceedings of the 10th Symposium on Sensing via Image Information, pp. 547-552, 2004, Japanese Unexamined Patent Application Publication No. 2005-157679, and so forth.

Figure 6:
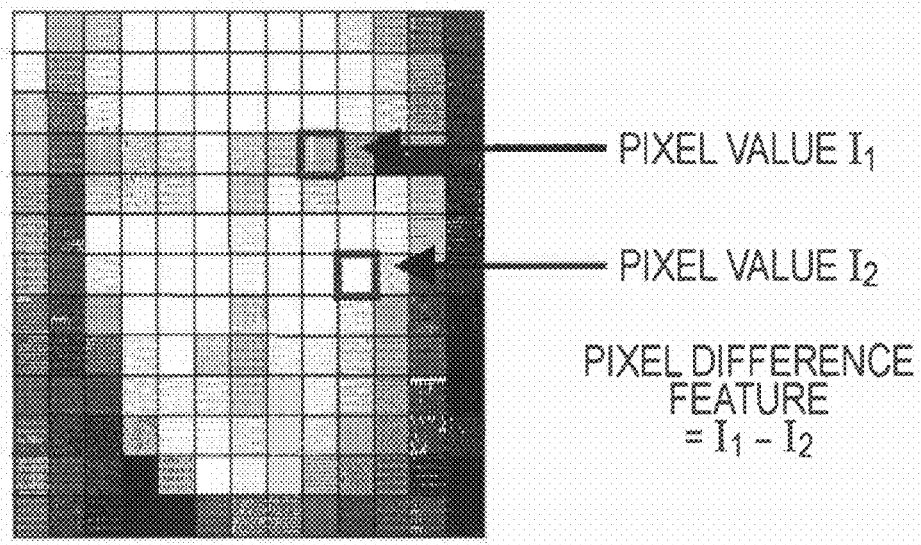
FIG. 6 is a diagram illustrating a pixel difference feature serving as an image feature value.

FIG. 6 is a diagram illustrating an overview of a pixel difference feature. The pixel difference feature can be obtained by determining the difference between pixel values (brightness values) $I_1$ and $I_2$ of two pixels on an image, i.e., $I_1-I_2$. Each of binary-classification weak classifiers h(x), which corresponds to a combination of two pixels, recognizes true (+1) or false (−1), as given by Equation (1) below, using the pixel difference feature (given by $I_1-I_2$) and a threshold Th:

$$h(x)=-1 \text{ if } I_1-I_2 \leq \text{Th}$$

$$h(x)=+1 \text{ if } I_1-I_2 > \text{Th} \quad (1)$$

If a pixel difference feature is determined without the resizing of an input image, a large number of combinations of two pixels may be obtained. Thus, a pixel difference feature is obtained after an input image is resized. For example, when an input image is resized to 20×20 pixels, 400×399 pixel difference features are obtained. When an input image is resized to 64×64 pixels, 4096×4095 pixel difference features are obtained. The plurality of combinations of two pixels and the threshold Th serve as the parameters of binary classification weak classifiers, and an optimum set of parameters is selected using boosting learning.

The multi-class classifier 23 calculates and outputs a K-dimensional score vector corresponding to a face image of a registered person (hereinafter also referred to as a "register image") input from the register image input unit 24. The output K-dimensional score vector corresponding to the output register image is registered in the registration database 25 in association with identification information (such as name) about the corresponding registered person.

The multi-class classifier 23 further calculates and outputs a K-dimensional score vector corresponding to an identification image input from the identification image input unit 26 via the pre-processing unit 27. The output K-dimensional score vector corresponding to the identification image is supplied to the similarity determination unit 28.

The register image input unit 24 resizes a face image of a registered person in a manner similar to that in which the learning sample input unit 21 resizes the sample images, and inputs the resulting face image to the multi-class classifier 23. The register image input unit 24 also inputs identification information (such as name) about the registered person to the registration database 25.

The registration database 25 stores the K-dimensional score vector corresponding to the face image of the registered person in association with the identification information about the registered person.

The identification image input unit 26 inputs a face image to be identified (identification image) to the multi-class classifier 23 via the pre-processing unit 27.

The pre-processing unit 27 performs pre-processing (specifically, image processing for correcting a non-front-facing face into a front-facing face) on the identification image input from the identification image input unit 26, as necessary. Further, the pre-processing unit 27 resizes the identification image pre-processed as necessary in a manner similar to that in which the learning sample input unit 21 resizes the sample images, and inputs the resulting identification image to the multi-class classifier 23.

The similarity determination unit 28 specifies the K-dimensional score vector that is the most similar to the K-dimensional score vector corresponding to the identification image (for example, the K-dimensional score vector having the shortest Euclidean distance and having a Euclidean distance less than or equal to a predetermined threshold) among the K-dimensional score vectors registered in the registration database 25, and outputs identification information about the corresponding registered person as an identification result.

3. Operation of Face Image Identification Apparatus According to Embodiment

Figure 7:
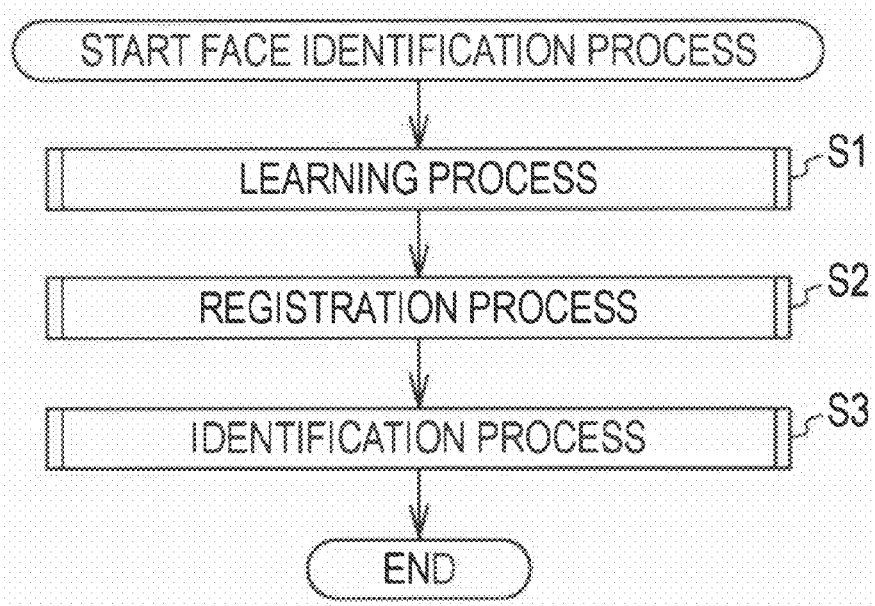
FIG. 7 is a flowchart illustrating the operation of the face image identification apparatus.

FIG. 7 is a flowchart illustrating the operation of the face image identification apparatus 10.

In step S1, the learning system 11 of the face image identification apparatus 10 executes the learning process to generate the multi-class classifier 23.

In step S2, the registration system 12 of the face image identification apparatus 10 executes the registration process to calculate a K-dimensional score vector corresponding to a register image, and registers the K-dimensional score vector in the registration database 25 in association with the identification information about the corresponding registered person.

In step S3, the identification system 13 of the face image identification apparatus 10 executes the identification process to specify the registered person that is the most similar to the person in the identification image.

The processing of steps S1 to S3 described above will now be described in detail.

Figure 8:
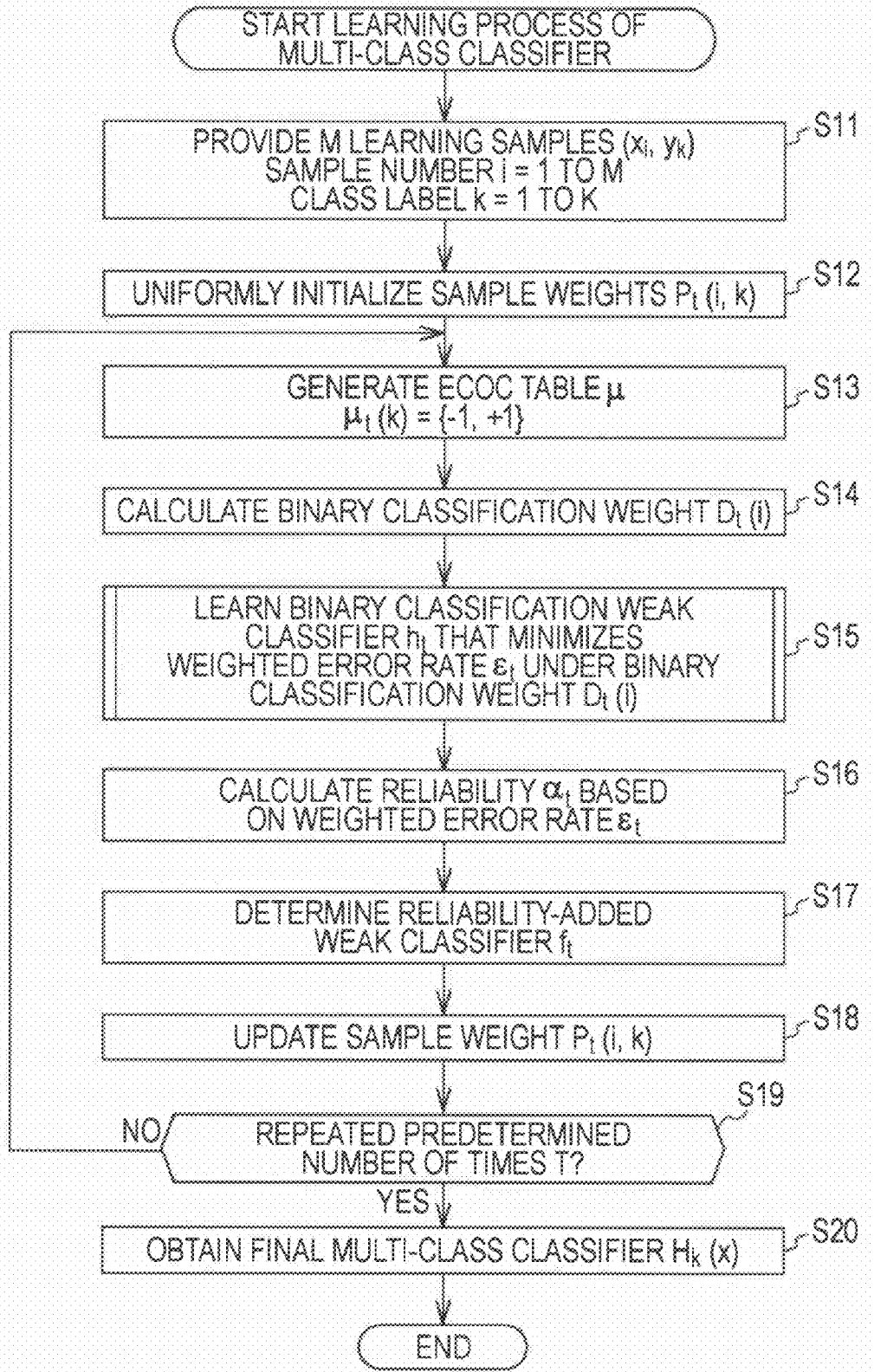
FIG. 8 is a flowchart illustrating the learning process.

The details of the learning process will be described. FIG. 8 is a flowchart illustrating the learning process.

In step S11, as illustrated in FIG. 5, the learning sample input unit 21 inputs M learning samples $(x_i, y_k)$ to the multi-class classifier learning unit 22.

In step S12, the multi-class classifier learning unit 22 initializes sample weights $P_t(i, k)$, which are represented by M rows and K columns, using Equation (2) as follows:

$$P_1(i, k) = 1/M(K-1) \text{ for } y_k \neq k \qquad (2)$$

Specifically, the initial values $P_1(i, k)$ of the sample weights $P_t(i, k)$ are set to uniform values in which sample weights corresponding to existing learning samples $(x_i, y_k)$ are 0 whereas otherwise the sum of the values is 1.

The processing of steps S13 to S18 described below is repeated a desired number of times T. The number of times T can be set to up to the number of pixel difference features obtained on a sample image, and the same number of weak classifiers as the number of times T are generated.

In step S13, the multi-class classifier learning unit 22 generates an ECOC table of 1 row and K columns. The values $\mu_t(k)$ in the k columns of the ECOC table are minus 1 (−1) or plus 1 (+1), and are assigned at random so that the number of minus 1s (−1) equals the number of plus 1s (+1), that is, $$\mu_t(k) = \{-1, +1\}. \qquad (3)$$

In step S14, the multi-class classifier learning unit 22 calculates binary classification weights $D_t(i)$, which are represented by M rows and 1 column, using Equation (4) as follows:

$$D_t(i) = \frac{\sum_{k}^{K} P(i, k)[\mu_t(y_i) \neq \mu(k)]}{\sum_{j}^{M} \sum_{k}^{K} P(j, k)[\mu_t(y_j) \neq \mu(k)]},  \qquad (4)$$

where [ ] denotes the Boolean expression which uses 1 for true and 0 for false.

In step S15, the multi-class classifier learning unit 22 learns a binary classification weak classifier $h_t$ that minimizes the weighted error rate $\epsilon_t$, which is given by Equation (5) below, under the binary classification weights $D_t(i)$ obtained in step S14:

$$\epsilon_t = \sum_{i:h_t(x_i) \neq \mu(y_i)} D_t(i) \qquad (5)$$

Figure 9:
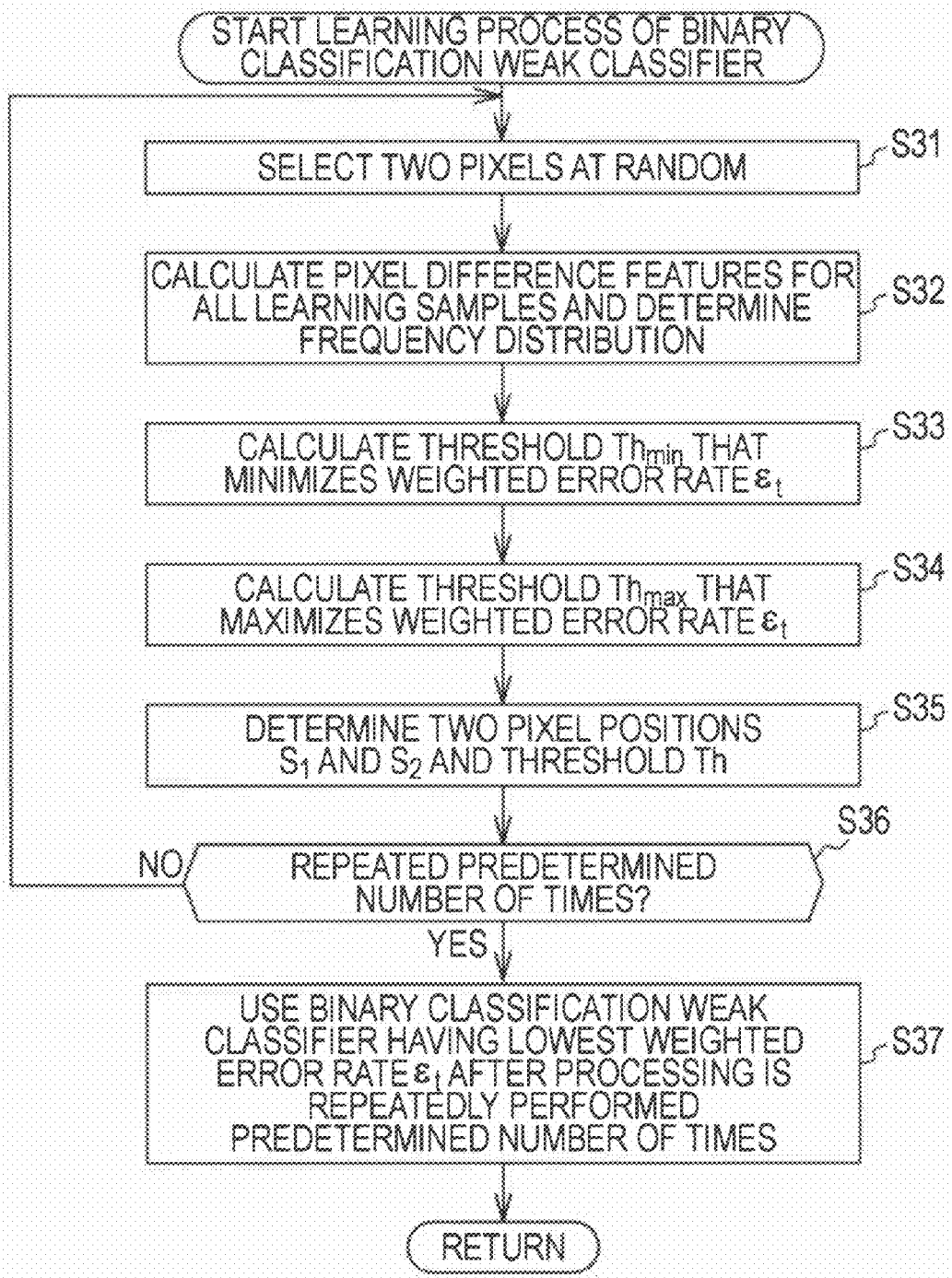
FIG. 9 is a flowchart illustrating a learning process of a binary-classification weak classifier.

FIG. 9 is a flowchart illustrating the processing of step S15 in detail.

In step S31, the multi-class classifier learning unit 22 selects two pixels at random from among all the pixels of a resized sample image. For example, when a sample image is resized to 64×64 pixels, two pixels are selected by selecting one of 4096×4095 combinations of two pixels. Here, the pixel positions of the selected two pixels are represented by $S_1$ and $S_2$, and the pixel values (brightness values) of the two pixels are represented by $I_1$ and $I_2$.

In step S32, the multi-class classifier learning unit 22 determines, for all the learning samples, pixel difference features $(I_1-I_2)$ using the pixel values $I_1$ and $I_2$ of the two pixels selected in step S31, and determines a frequency distribution of the pixel difference features.

In step S33, the multi-class classifier learning unit 22 determines a threshold $Th_{min}$ that sets the weighted error rate $\epsilon_t$ given by Equation (5) to a minimum $\epsilon_{min}$ on the basis of the frequency distribution of the pixel difference features.

In step S34, the multi-class classifier learning unit 22 determines a threshold $Th_{max}$ that sets the weighted error rate $\epsilon_t$ given by Equation (5) to a maximum $\epsilon_{max}$ on the basis of the frequency distribution of the pixel difference features. Further, the multi-class classifier learning unit 22 inverts the threshold $Th_{max}$ and other values according to Equation (6) as follows:

$$\epsilon'_{max} = 1 - \epsilon_{max}$$

$$S'_1 = S_2$$

$$S'_2 = S_1$$

$$Th'_{max} = Th_{max} \qquad (6)$$

In step S35, the multi-class classifier learning unit 22 determines the positions $S_1$ and $S_2$ of the two pixels and the threshold Th, which are the parameters of the binary classification weak classifiers, on the basis of the relationship in magnitude between the minimum $\epsilon_{min}$ and the maximum $\epsilon_{max}$ of the weighted error rate $\epsilon_t$ described above.

Specifically, when $\epsilon_{min} < \epsilon'_{max}$, the positions $S_1$ and $S_2$ of the two pixels and the threshold $Th_{min}$ are used as the parameters. When $\epsilon_{min} \geq \epsilon'_{max}$, the positions $S'_1$ and $S'_2$ of the two pixels and the threshold $Th'_{max}$ are used as the parameters.

In step S36, the multi-class classifier learning unit 22 determines whether or not the processing of steps S31 to S35 described above has repeated a predetermined number of times. The process returns to step S31, and the processing subsequent thereto is repeated until it is determined that the processing has repeated the predetermined number of times. When it is determined that the processing of steps S31 to S35 has repeated the predetermined number of times, the process proceeds to step S37.

In step S37, the multi-class classifier learning unit 22 finally uses (the parameters of) of one of binary classification weak classifiers determined in the processing of step S35 repeatedly performed the predetermined number of times as described above, which minimizes the weighted error rate $\epsilon_t$, as (the parameters of) one binary classification weak classifier $h_t$.

As described above, after one binary classification weak classifier $h_t$ is determined, the process returns to step S16 of FIG. 8.

In step S16, the multi-class classifier learning unit 22 calculates reliability $\alpha_t$ using Equation (7) below on the basis of the weighted error rate $\epsilon_t$ corresponding to the binary classification weak classifier $h_t$ determined in step S15:

$$\alpha_t = \frac{1}{2}\ln\left(\frac{1-\varepsilon_t}{\varepsilon_t}\right) \quad (7)$$

In step S17, the multi-class classifier learning unit 22 multiplies the binary classification weak classifier $h_t$ determined in step S15 by the reliability $\alpha_t$ calculated in step S16 to determine a reliability-added binary classification weak classifier $f_t(x_i)$, as given in Equation (8) as follows:

$$f_t(x_i) = \alpha_t h_t \quad (8)$$

In step S18, the multi-class classifier learning unit 22 updates the sample weights $P_t(i, k)$, which are represented by M rows and K columns, using Equation (9) as follows:

$$P_{t+1}(i, k) = \frac{P_t(i, k)\exp\left(\frac{f_t(x_i)\mu_t(k) - f_t(x_i)\mu_t(y_i)}{2}\right)}{Z_t}, \quad (9)$$

where $Z_t$ is given by Equation (10) as follows:

$$Z_t = \sum_i^M \sum_k^K P_t(i, k)\exp\left(\frac{f_t(x_i)\mu_t(k) - f_t(x_i)\mu_t(y_i)}{2}\right) \quad (10)$$

In step S19, the multi-class classifier learning unit 22 determines whether or not the processing of steps S13 to S18 described above has repeated a predetermined number of times T. The process returns to step S13, and the processing subsequent thereto is repeated until it is determined that the processing has repeated the predetermined number of times T. When it is determined that the processing of steps S13 to S18 has repeated the predetermined number of times T, the process proceeds to step S20.

In step S20, the multi-class classifier learning unit 22 obtains a final classifier $H_k(x)$, that is, the multi-class classifier 23, using Equation (11) below on the basis of the same number of obtained reliability-added binary classification weak classifiers $f_t(x)$ as the predetermined number of times T and the corresponding ECOC tables:

$$H_k(x) = \sum_{t=1}^T f_t(x)\mu_t(k) \quad (11)$$

The obtained multi-class classifier 23 has, as parameters, the number of classes K and the number of weak classifiers T. Each weak classifier has, as parameters, the positions $S_1$ and $S_2$ of two pixels on a resized input image, a threshold Th for the classification of pixel difference features, a reliability a, and an ECOC table $\mu$.

Accordingly, the final classifier $H_k(x)$, that is, the multi-class classifier 23, is obtained, and the learning process ends.

The multi-class classifier 23 generated in the manner described above can represent the image feature value of the input face image using a K-dimensional score vector. For example, when sample persons are represented by A, B, C, ..., the degrees to which each registered person is similar to the sample persons A, B, C, ..., can be represented by numerical values. Further, the degrees to which the identification image is similar to the sample persons A, B, C, ..., can be represented by numerical values.

The details of the registration process will now be described.

Figure 10:
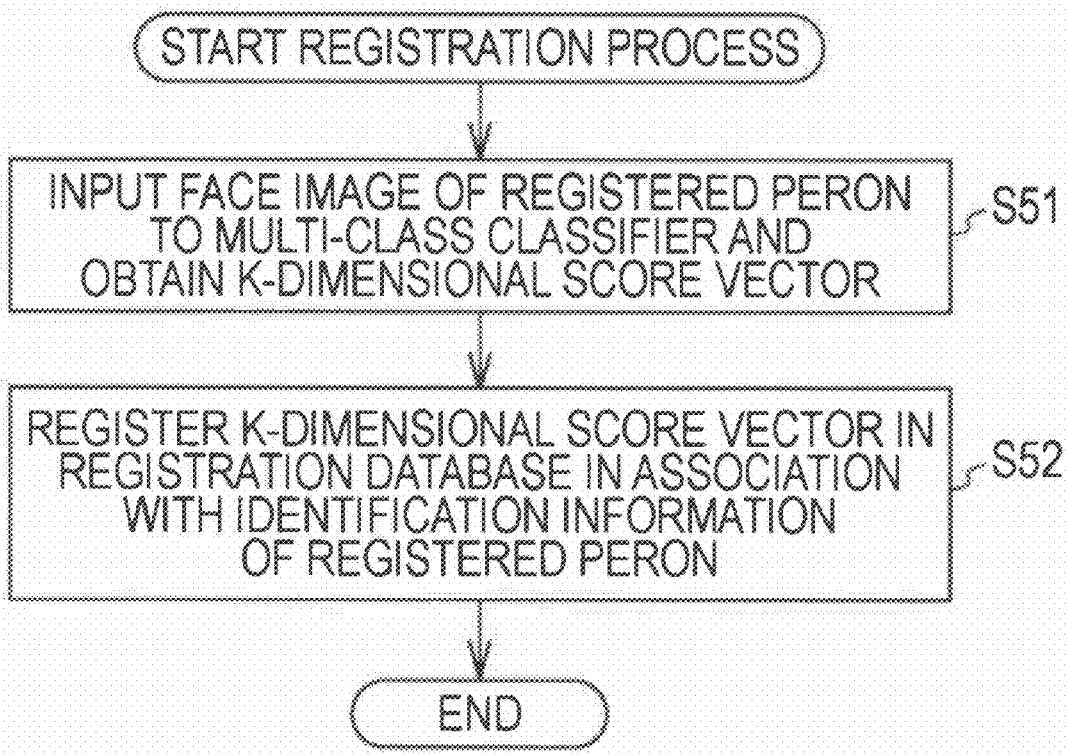
FIG. 10 is a flowchart illustrating the registration process.

FIG. 10 is a flowchart illustrating the registration process.

In step S51, the register image input unit 24 resizes a face image of a registered person (register image), inputs the resulting face image to the multi-class classifier 23, and also inputs identification information about the registered person to the registration database 25. The multi-class classifier 23 calculates a K-dimensional score vector corresponding to the register image, and outputs the calculated K-dimensional score vector to the registration database 25.

In step S52, the registration database 25 stores the K-dimensional score vector corresponding to the face image of the registered person in association with the identification information about the registered person. Thus, the registration process ends.

The process of computing a K-dimensional score vector corresponding to a register image using the multi-class classifier 23 will now be described in detail.

Figure 11:
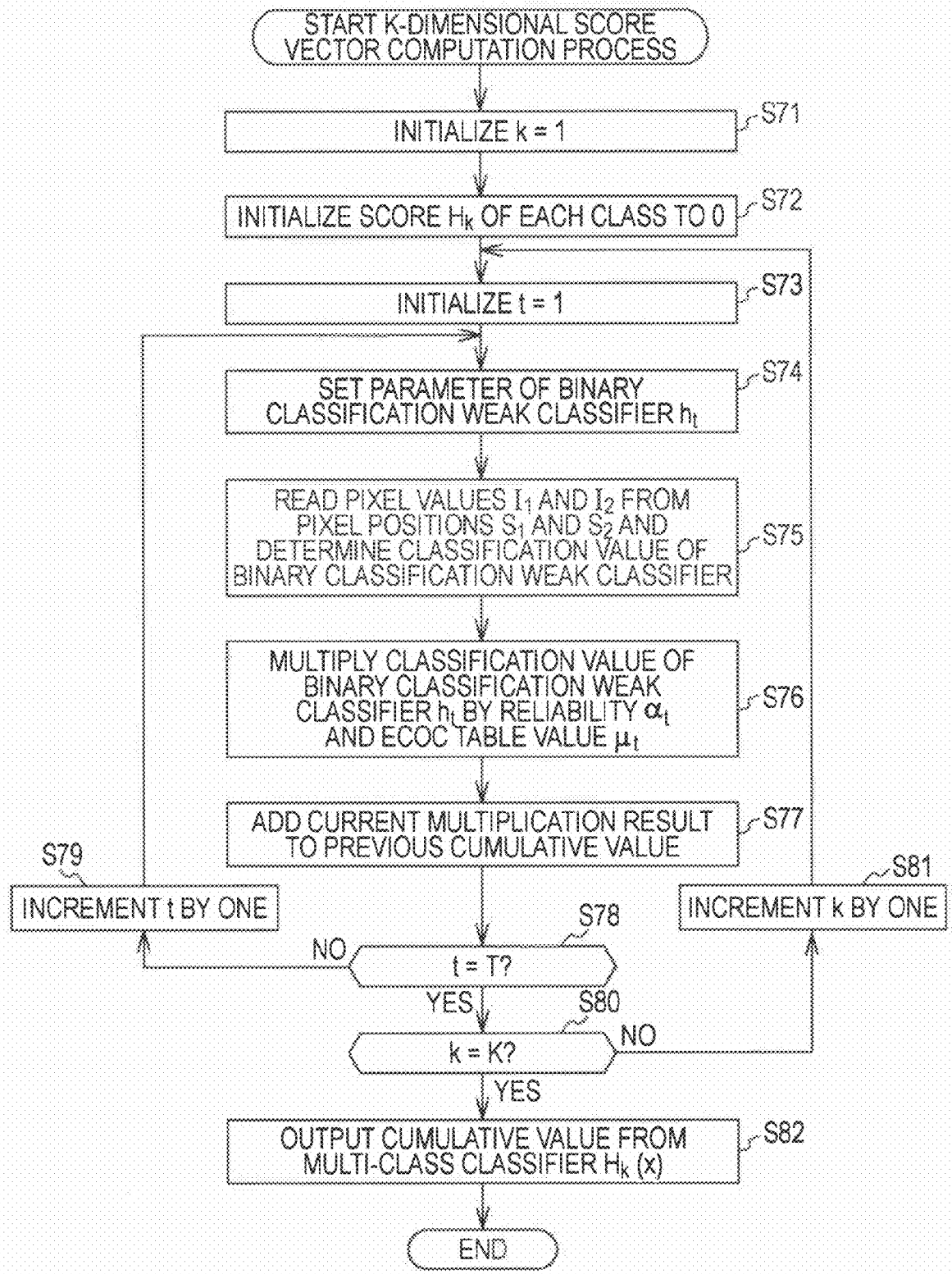
FIG. 11 is a flowchart illustrating a K-dimensional score vector calculation process.

FIG. 11 is a flowchart illustrating the process of computing a K-dimensional score vector for an input image (here, a register image) x.

In step S71, the multi-class classifier 23 initializes a parameter k (k=1, 2, ..., K) indicating a class to 1. In step S72, the multi-class classifier 23 initializes the score $H_k$ of each class to 0.

In step S73, the multi-class classifier 23 initializes a parameter t (t=1, 2, ..., T) for specifying a weak classifier to 1.

In step S74, the multi-class classifier 23 sets parameters of a binary classification weak classifier $h_t$, that is, the positions $S_1$ and $S_2$ of two pixels on the resized input image x, a threshold Th for classifying pixel difference features, a reliability $\alpha$, and an ECOC table $\mu$.

In step S75, the multi-class classifier 23 reads the pixel values $I_1$ and $I_2$ on the basis of the positions $S_1$ and $S_2$ of the two pixels on the input image x, calculates the pixel difference feature $(I_1-I_2)$, and compares the pixel difference feature with the threshold Th to obtain the classification value (−1 or +1) of the binary classification weak classifier $h_t$.

In step S76, the multi-class classifier 23 multiplies the classification value of the binary classification weak classifier $h_t$ obtained in step S75 by the reliability $\alpha_t$ and further by the values $\mu_t(k)$ of the ECOC table of 1 row and K columns to obtain class scores $H_k$ of 1 row and K columns corresponding to the parameter t.

In step S77, the multi-class classifier 23 adds the class scores $H_k$ of 1 row and K columns corresponding to the parameter t, which are obtained in step S76, to the previous (that is, t−1) cumulative value of the class scores $H_k$ to update the class scores $H_k$ of 1 row and K columns.

In step S78, the multi-class classifier 23 determines whether or not the parameter t satisfies t=T. When a negative determination is obtained, the process proceeds to step S79, and the parameter t is incremented by one. Then, the process returns to step S74, and the processing subsequent thereto is repeated. Thereafter, when it is determined in step S78 that the parameter t satisfies t=T, the process proceeds to step S80.

In step S80, the multi-class classifier 23 determines whether or not the parameter k satisfies k=K. When it is determined that the parameter k does not satisfy k=K, the process proceeds to step S81, and the parameter k is incremented by one. Then, the process returns to step S73, and the processing subsequent thereto is repeated. Thereafter, when it is determined in step S80 that the parameter k satisfies k=K, the process proceeds to step S82.

In step S82, the multi-class classifier 23 outputs the class scores $H_k$ of 1 row and K columns, which are currently obtained, to the subsequent stage (in this case, the registration database 25) as the output of the multi-class classifier 23, that is, as a K-dimensional score vector. Thus, the K-dimensional score vector computation process ends.

The details of the identification process will now be described.

Figure 12:
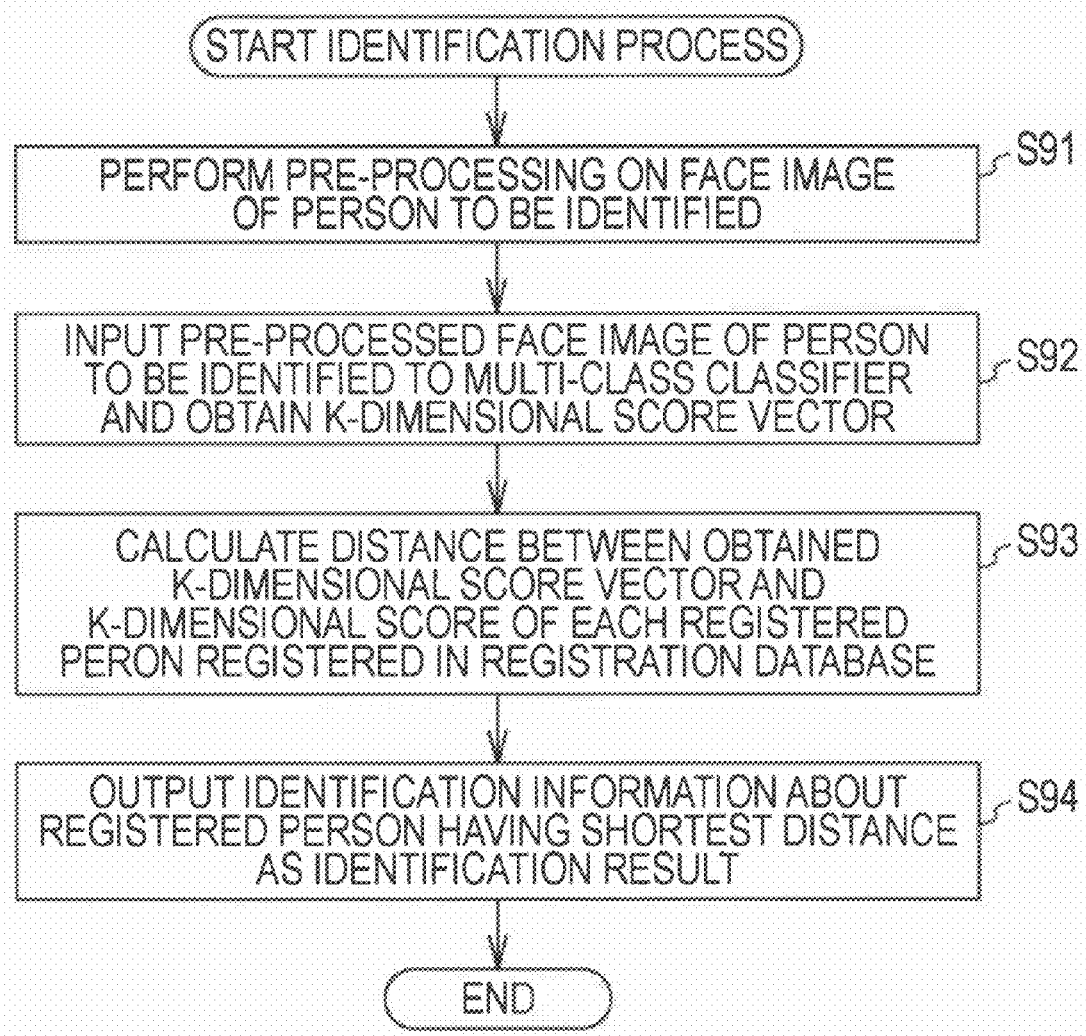
FIG. 12 is a flowchart illustrating the identification process.

FIG. 12 is a flowchart illustrating the identification process.

In step S91, the identification image input unit 26 inputs a face image to be identified (identification image) to the pre-processing unit 27. The pre-processing unit 27 performs pre-processing on the identification image input from the identification image input unit 26, as necessary, and resizes the face image. The resulting face image is input to the multi-class classifier 23.

Figure 13:
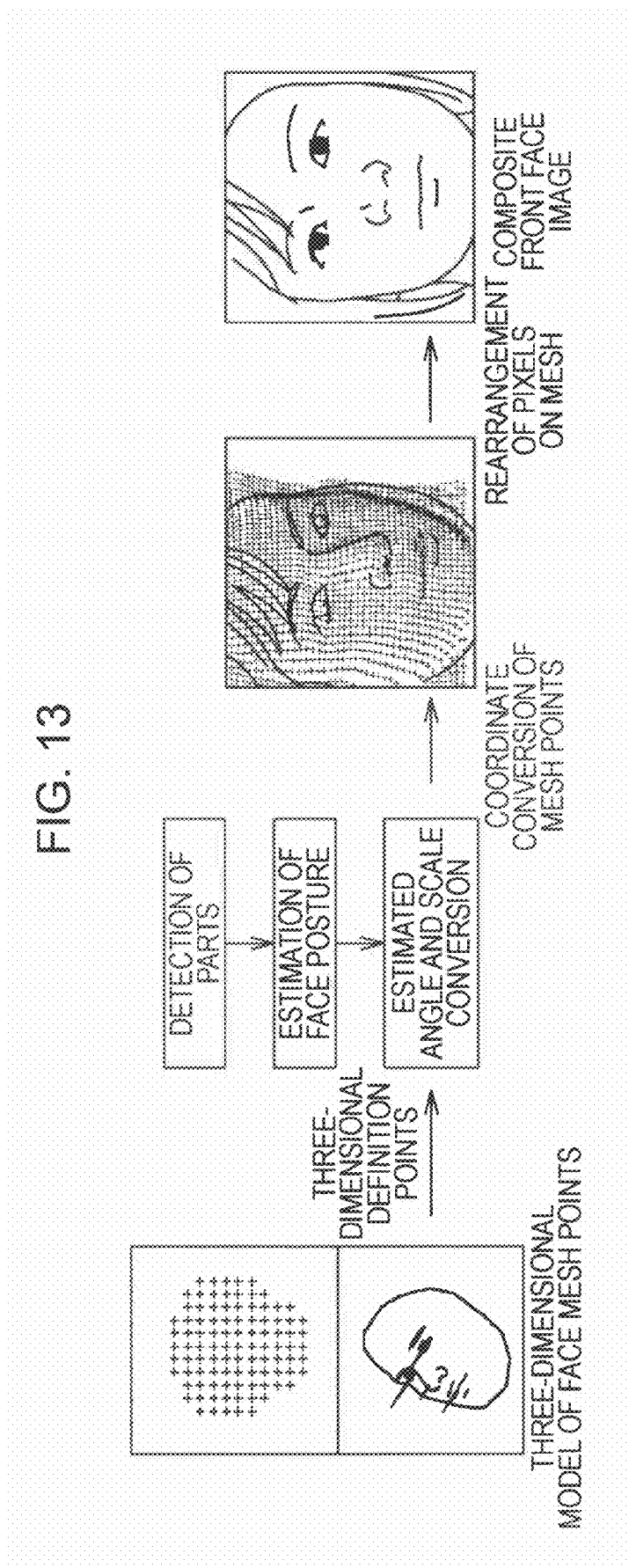
FIG. 13 is a diagram illustrating an example of pre-processing.

FIG. 13 illustrates an example of the pre-processing. In the pre-processing, parts such as eye, nose, and mouth portions are detected from the face image (in this case, the identification image), and the positions of the parts are compared with those in a predetermined geometric model of an average face to estimate the orientation (or posture) of the face image. Further, the parts of the face image are mapped to a front-facing face image on the basis of the predetermined geometric model of the average face to correct the face image to a front-facing face image.

The above pre-processing may be performed on a sample image and a register image, as necessary.

Referring back to FIG. 12, in step S92, the multi-class classifier 23 calculates a K-dimensional score vector corresponding to the identification image pre-processed as necessary and resized, and outputs the resulting K-dimensional score vector to the similarity determination unit 28. The calculation of the K-dimensional score vector corresponding to the identification image is similar to the calculation of the K-dimensional score vector corresponding to the register image described above with reference to FIG. 11, and a description thereof is thus omitted.

In step S93, the similarity determination unit 28 determines the distance (for example, Euclidean distance) between the K-dimensional score vector corresponding to the identification image and each of the K-dimensional score vectors registered in the registration database 25. In step S94, the similarity determination unit 28 specifies the K-dimensional score vector having the shortest distance and having a distance less than or equal to a predetermined threshold, and outputs identification information about the corresponding registered person as an identification result. Thus, the identification process ends.

As described above, in the operation of the face image identification apparatus 10, with the application of AdaBoost ECOC learning to a multi-class classifier, an expected value of −1 or +1 is assigned to each class using an ECOC table. Thus, a multi-class problem can be solved as a two-class problem, and the use efficiency of a memory can be increased. In addition, learning that allows the discrimination of a large number of different persons can be realized.

Furthermore, the face image identification apparatus 10 uses the output (K-dimensional score vector) of the multi-class classifier 23 as a feature value representing the difference between face images rather than using the output of the multi-class classifier 23 directly as an identification result.

Therefore, even when a face image of a person that is not included in learned or registered persons is used as an identification image, high identification performance can be achieved.

4. Component-Based Multi-Class Classifiers

In general, humans determine similarity between faces not only based on the similarity between the entire faces but also based on the similarity in terms of each face part. For example, a person may determine that an eye is similar to that of a sample person A, a nose is similar to that of a sample person B, and a mouth is similar to that of a sample person C.

Thus, the functionality of the face image identification apparatus 10 may be extended so that a face identification process including the determination of not only the similarity between entire faces but also the similarity in terms of each face part can be executed.

Figure 14:
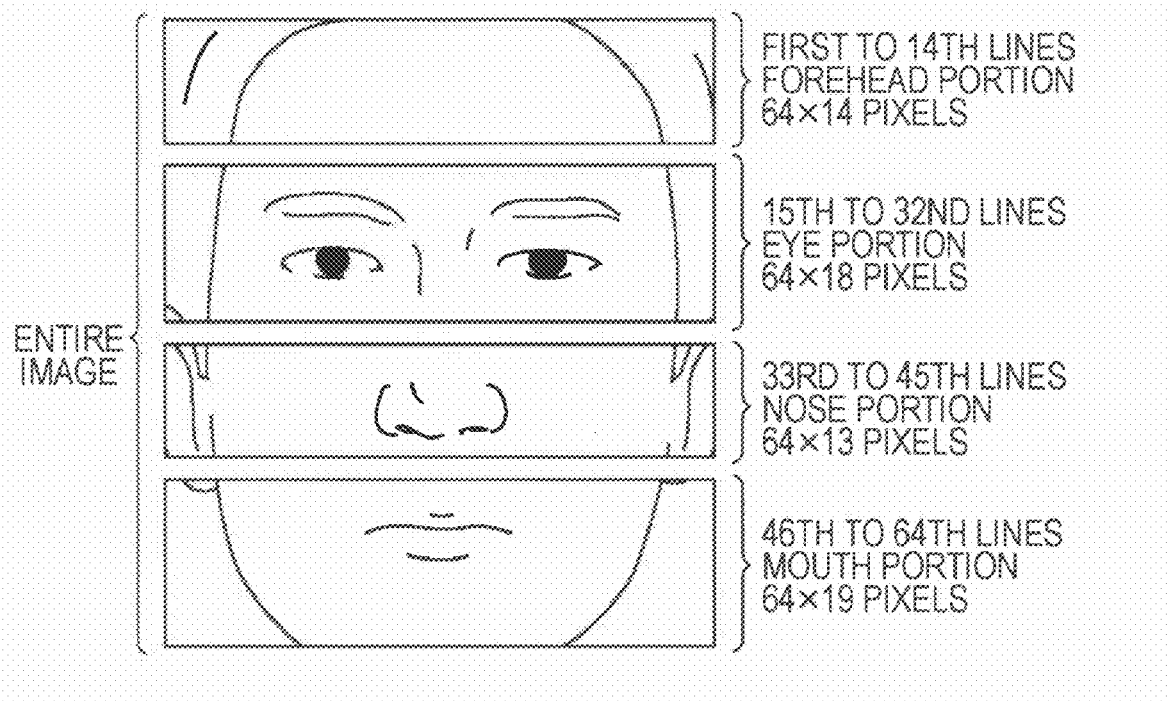
FIG. 14 is a diagram illustrating an example of segments of a face image.

Specifically, a resized sample image is divided into individual parts: a forehead portion, an eye portion, a nose portion, and a mouth portion. The widths of the portions may be, for example, as illustrated in FIG. 14, the first to 14th lines for the forehead portion, the 15th to 32nd lines for the eye portion, the 33rd to 45th lines for the nose portion, and the 46th to 64th lines for the mouth portion when the resized face image is an image of 64×64 pixels.

Figure 15:
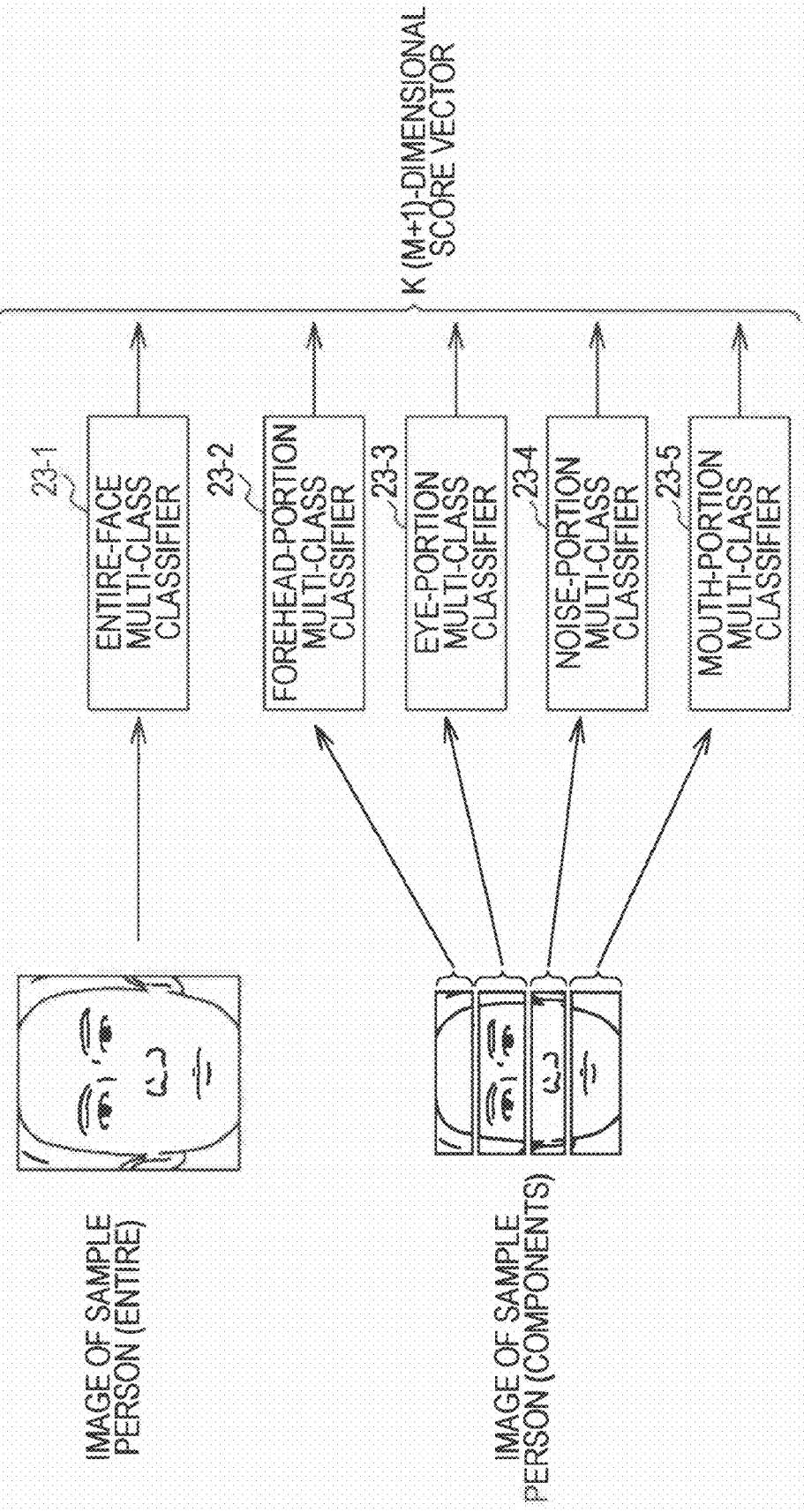
FIG. 15 is a diagram illustrating a component-based multi-class classifier.

Then, as illustrated in FIG. 15, in addition to an entire-face multi-class classifier 23-1 (which corresponds to the multi-class classifier 23), multi-class classifiers 23-2 to 23-5 for individual parts are individually learned on the basis of the resulting parts.

Also in each of the registration process and the identification process, a resized register image or identification image is divided into individual parts: a forehead portion, an eye portion, a nose portion, and a mouth portion, and not only a K-dimensional score vector for the entire face but also K-dimensional score vectors for the individual parts are computed.

In this manner, in addition to the entire-face multi-class classifier 23-1 used for the entire face image, the multi-class classifiers 23-1 to 23-5 used for the individual parts of the face image are provided, and the outputs (K-dimensional score vectors) of the multi-class classifiers 23-1 to 23-5 are concatenated. Thus, a K(1+M)-dimensional score vector can be obtained for the input image (register image or identification image), where M is the number of segments of a face image and, in this example, M=4. More detailed characteristics of the register image and the identification image can be found. Therefore, identification images can be more accurately identified.

5. Another Example of Class Labels

In the foregoing description, identification information (for example, name) about one of the K sample persons is added to the sample images provided for the person as a class label. However, attribute information about the sample person may also be added to the sample images as a class label, and the added information may be learned by the multi-class classifier 23. Examples of attribute information about a sample person may include information for which the same sample person may belong to the same attribute, such as race, age, gender, and the presence of glasses.

Then, a concatenation of the output of the multi-class classifier 23, which has learned identification information as a class label, and the outputs of multi-class classifiers, which have learned the individual pieces of attribute information as class labels, can give more detailed characteristics of the register image and the identification image to than those obtained when only identification information is learned as a class label. Therefore, the identification image can be more accurately identified.

6. Selection of Dimension of Feature Values

As described above, a feature value (score vector) of an entire face image is of K dimensions, and a concatenation of feature values obtained when the face image is segmented into parts and then learning is performed is of K(1+M) dimensions. Further, additional learning of attribute information increases the number of dimensions of feature values. The increase in dimensionality of feature values of an input image gives more detailed characteristics of the input image, resulting in more accurate identification of the identification image.

However, if the number of dimensions of feature values increases, a redundant dimension of feature values of an input image can exist. Further, depending on the number of sample persons K, the number of dimensions may increase significantly.

Thus, a dimension that can provide efficient implementations of identification performance is selected from among a large number of dimensions of feature values and is used. A selection of dimension can be based on, for example, sequential search.

In sequential forward search, which is a sequential search technique, one dimension is selected by selecting the dimension having the highest recognition rate of learning samples, and subsequent dimensions are selected by selecting dimensions one by one from the dimension having the highest recognition rate in combination with the previously selected dimension (or dimensions).

In sequential floating search, which is another sequential search technique, the dimension having the highest recognition rate is selected by increasing or decreasing the dimensions of feature values one by one.

Accordingly, a reduction in the number of multi-class classifiers ineffective for the identification of a face image can reduce the amount of calculation or reduce the number of memories used for the calculation process.

7. Layered Classifiers

A method for reducing the number of classes to be determined using a multi-class classifier, that is, the number of dimensions of feature values, using a technique different from that for the selection of dimension of feature values described above will be described.

Figure 16:
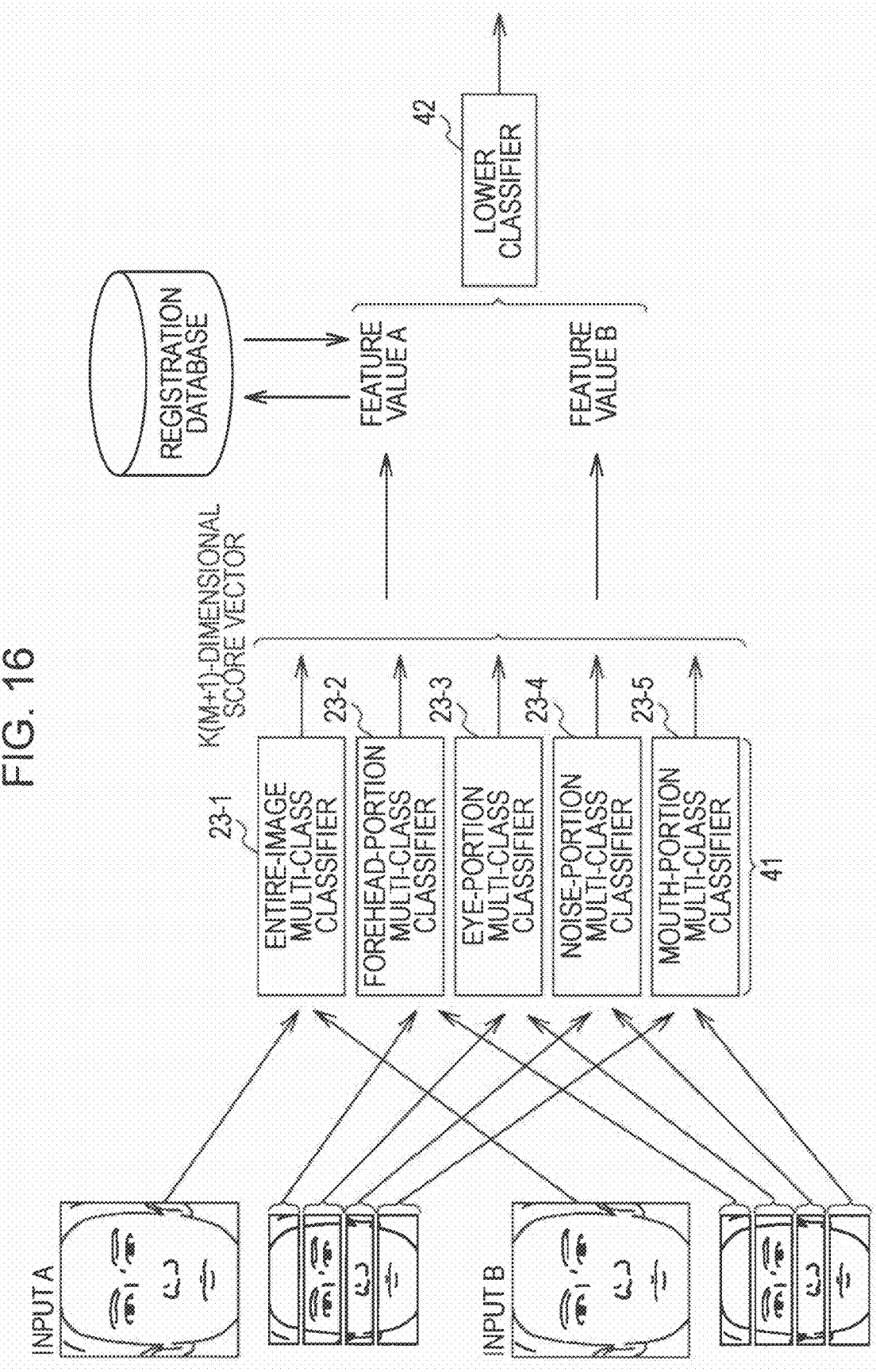
FIG. 16 is a diagram illustrating a layered multi-class classifier.

Specifically, as illustrated in FIG. 16, a lower classifier 42 is provided after an upper multi-class classifier 41 (the entire-face multi-class classifier 23-1 and the multi-class classifiers 23-2 to 23-5 for the individual parts). The upper multi-class classifier 41 determines a class corresponding to an input image (or calculates a feature value (K(M+1)-dimensional score vector)) whereas the lower classifier 42 determines whether or not two feature values input from the upper multi-class classifier 41 belong to the same person.

In the multi-class classifier described above, feature values of input images (a register image and an identification image) are calculated, and the identity of the same person is determined in accordance with the distance between feature values. It is assumed that a criterion for determining the identity of the same person is uniform in the space of multiple dimensions. However, the distance, which is a criterion for determining the identity of the same person, is not necessarily uniform in the space of multiple dimensions.

Thus, feature values corresponding to two face images of the same person or two feature values corresponding to face images of two different persons may be input from the upper multi-class classifier 41 to the lower classifier 42, and boosting learning for directly determining whether or not the input feature values belong to the same person may be performed.

In the boosting learning of the lower classifier 42, the dimensionality of feature values is selected in the stage of learning weak classifiers forming the lower classifier 42. Thus, the number of weak classifiers T is set to a desired number (the number of dimensions of feature values after the reduction of dimensionality), and therefore the dimensionality of feature values, which is used for classification, can be reduced.

Furthermore, the reduction in a dimension of feature values, which is not used in the lower classifier 42, can also be performed by the upper multi-class classifier 41.

In a case where the lower classifier 42 is provided after the upper multi-class classifier 41 in the manner described above, image identification is performed in the following procedure: As illustrated in FIG. 16, in the registration process, a plurality of register images (including an input A in FIG. 16) are input to the upper multi-class classifier 41, and the corresponding feature values (including a feature value A) are calculated and are registered in a registration database.

In the identification process, an identification image (an input B in FIG. 16) is input to the upper multi-class classifier 41, and a feature value B thereof is calculated and is input to the lower classifier 42. The feature values of the register images registered in the registration database are sequentially input to the lower classifier 42, and are each combined with the feature value B of the identification image to determine a score indicating whether or not the feature values belong to the same person. It is determined that one of the register images that has the highest score belongs to the same person as that in the identification image.

Accordingly, layered classifiers allow more accurate determination and allow selective reduction of feature values in an upper multi-class classifier.

8. Other Image Feature Values

While the embodiment employs pixel difference features (Pix Dif Feature) as image feature values, other image feature values may be used.

Examples of available image feature values may include a low-dimensional version of an input image using principal component analysis (PCA), and rectangle features. Rectangle features are disclosed in, for example, "Robust Real-time Object Detection", Viola 2001.

FIGS. 17A to 17D and FIG. 18 are diagrams illustrating rectangle features.

As illustrated in FIGS. 17A to 17D, adjacent rectangular regions of the same size are provided on an input image, and the sum of the brightness values of the rectangular regions is determined. The difference between the sum of the brightness values of one of the rectangular regions and the sum of the brightness values of the other rectangular region is used as an image feature value.

Figure 17A:
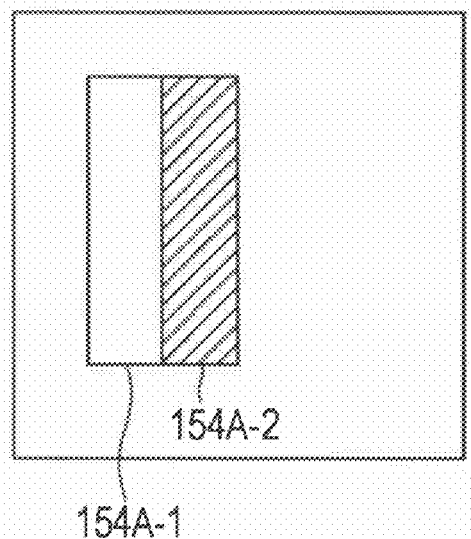
FIGS. 17A to 17D are diagrams illustrating rectangle features serving as image feature values.

For example, in the example illustrated in FIG. 17A, the difference between the sum of the brightness values of a rectangular region 154A-1 and the sum of the brightness values of a hatched rectangular region 154A-2 is used as an image feature value. Similarly, in the example illustrated in FIG. 17B, the difference between the sum of the brightness values of a rectangular region 154B-1 and the sum of the brightness values of a hatched rectangular region 154B-2 is used as an image feature value. Such a feature obtained by two rectangular regions is referred to as a two-rectangle feature.

Figure 17B:
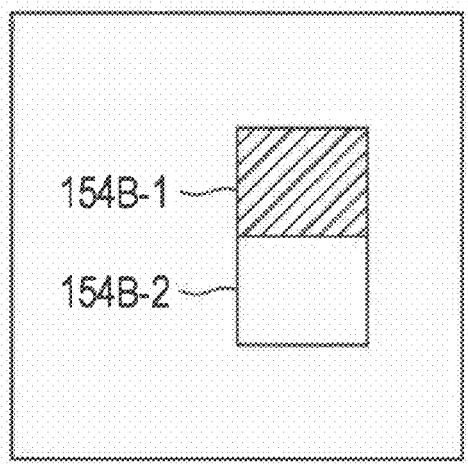
Figure 17C:
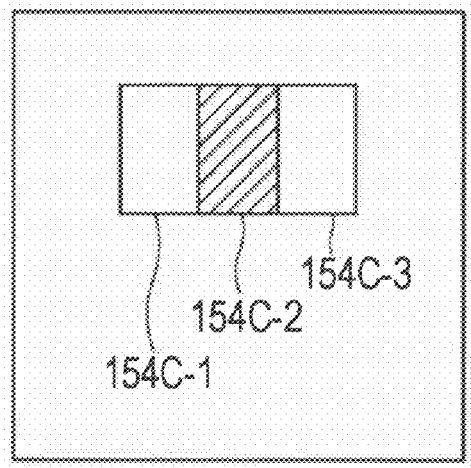

In the example illustrated in FIG. 17C, three rectangular regions 154C-1 to 154C-3 are provided, and the difference between the sum of the brightness values of the rectangular regions 154C-1 and 154C-3 and the sum of the brightness values of the center hatched rectangular region 154C-2 is used as an image feature value. Such a feature obtained by three rectangular regions is referred to as a three-rectangle feature.

Figure 17D:
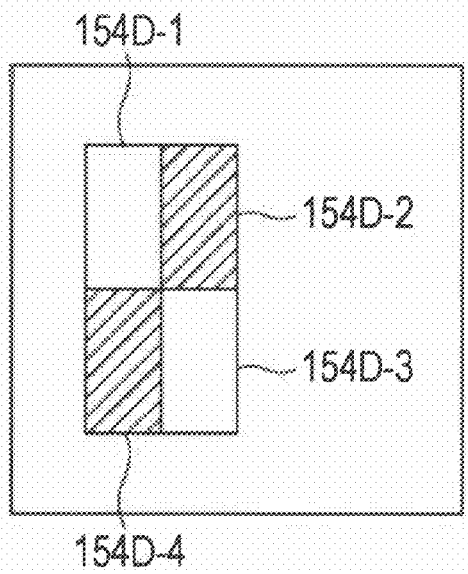

Further, in the example illustrated in FIG. 17D, four rectangular regions 154D-1 to 154D-4 are provided, and the difference between the sum of the brightness values of the rectangular regions 154D-1 and 154D-3 and the sum of the brightness values of the hatched rectangular regions 154D-2 and 154D-4 is used as an image feature value. Such a feature obtained by four rectangular regions is referred to as a four-rectangle feature.

For example, when the two-rectangle feature illustrated in FIG. 17B is applied to a human face, for example, as illustrated in FIG. 18, two rectangular regions 154B (154B-1, 154B-2) are configured so as to cover the main parts of a face image. The same may apply to the application of the two-rectangle feature illustrated in FIG. 17A, the three-rectangle feature illustrated in FIG. 17C, or the four-rectangle feature illustrated in FIG. 17D to a human face.

As described above, rectangle features other than pixel difference features may be used as image feature values. However, the use of pixel difference features allows more reduction in the amount of calculation than the use of other image feature values such as rectangle features, and allows a reduction in the capacity of a memory used for the calculation process.

The series of processes described above can be executed by hardware or software. When the series of processes is executed by software, a program constituting the software is installed from a program recording medium into a computer incorporated in dedicated hardware or a computer capable of executing various functions by installing various programs therein, such as a general-purpose personal computer.

FIG. 19 is a block diagram illustrating an example hardware configuration of a computer 200 that executes the series of processes described above according to a program.

In the computer 200, a central processing unit (CPU) 201, a read only memory (ROM) 202, and a random access memory (RAM) 203 are connected to one another via a bus 204.

An input/output interface 205 is further connected to the bus 204. The input/output interface 205 is connected to an input unit 206 including a keyboard, a mouse, and a microphone, an output unit 207 including a display and speakers, a storage unit 208 including a hard disk and a non-volatile memory, a communication unit 209 including a network interface, and a drive 210 that drives a removable medium 211 such as a magnetic disk, an optical disk, a magneto-optical disk, or a semiconductor memory.

In the computer 200 having the above configuration, the CPU 201 loads a program stored in, for example, the storage unit 208 into the RAM 203 via the input/output interface 205 and the bus 204, and executes the program, thereby performing the series of processes described above.

The program executed by the computer 200 (the CPU 201) may be recorded on the removable medium 211 which may be, for example, a package medium such as a magnetic disk (including a flexible disk), an optical disk (such as a compact disc-read only memory (CD-ROM) or a digital versatile disc (DVD)), a magneto-optical disk, or a semiconductor memory, or may be provided via a wired or wireless transmission medium such as a local area network, the Internet, or digital satellite broadcasting.

Then, the program can be installed into the storage unit 208 via the input/output interface 205 by placing the removable medium 211 in the drive 210. The program can also be received by the communication unit 209 via a wired or wireless transmission medium, and installed into the storage unit 208. Alternatively, the program can also be installed in advance in the ROM 202 or the storage unit 208.

The program executed by the computer 200 may be a program in which the processes are performed sequentially in the order stated, performed in parallel, or performed at a desired time such as when the processes are called.

The program may also be processed by a single computer or processed by a plurality of computers in a distributed manner. Further, the program may be transferred to a remote computer and executed thereby.

The embodiments of the present invention are not to be limited to the embodiment described above, and a variety of modifications can be made without departing from the scope of the present invention.

The present application contains subject matter related to that disclosed in Japanese Priority Patent Application JP 2009-154925 filed in the Japan Patent Office on Jun. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
learning means for performing Adaptive Boosting Error Correcting Output Coding learning using image feature values of a plurality of sample images each being assigned a class label to generate a multi-class classifier configured to output a multi-dimensional score vector corresponding to an input image;
registration means for inputting a register image to the multi-class classifier, and registering a multi-dimensional score vector corresponding to the input register image in association with identification information about the register image; and
determination means for inputting an identification image to be identified to the multi-class classifier, and determining a similarity between a multi-dimensional score vector corresponding to the input identification image and the registered multi-dimensional score vector corresponding to the register image, wherein
the learning means performs Adaptive Boosting Error Correcting Output Coding learning using image feature values of a plurality of sample images each being assigned one of K class labels to generate an entire-image multi-class classifier configured to output a K-dimensional score vector corresponding to an input image, and performs independent Adaptive Boosting Error Correcting Output Coding learning using an image feature value of each of segment images obtained by dividing each of the sample images into M parts to generate M part-based multi-class classifiers each configured to output a K-dimensional score vector corresponding to the input image.

2. The information processing apparatus according to claim 1, wherein each of the class labels includes at least one of identification information for identifying an individual subject in a corresponding one of the sample images and attribute information indicating an attribute of a subject in the corresponding one of the sample images.

3. The information processing apparatus according to claim 1, further comprising reduction means for selectively reducing dimensionality of the multi-class classifier.

4. The information processing apparatus according to claim 3, wherein the reduction means selectively reduces dimensionality of the multi-class classifier using sequential search.

5. The information processing apparatus according to claim 3, wherein the reduction means selectively reduces dimensionality of the multi-class classifier in accordance with a Boosting learning result of a lower classifier, the lower classifier being provided after the multi-class classifier and configured to receive an output of the multi-class classifier.

6. The information processing apparatus according to any of claims 1 and 2 to 5, wherein the image feature values are pixel difference features or rectangle features.

7. An information processing method for an information processing apparatus that identifies an input image, comprising:

performing, by a processor of the information processing apparatus, Adaptive Boosting Error Correcting Output Coding learning using image feature values of a plurality of sample images each being assigned a class label to generate a multi-class classifier configured to output a multi-dimensional score vector corresponding to the input image;

inputting a register image to the multi-class classifier, and registering a multi-dimensional score vector corresponding to the input register image in association with identification information about the register image; and inputting an identification image to be identified to the multi-class classifier, and determining a similarity between a multi-dimensional score vector corresponding to the input identification image and the registered multi-dimensional score vector corresponding to the register image, wherein the performing Adaptive Boosting Error Correcting Output Coding learning includes using image feature values of a plurality of sample images each being assigned one of K class labels to generate an entire-image multi-class classifier configured to output a K-dimensional score vector corresponding to an input image, and performing independent Adaptive Boosting Error Correcting Output Coding learning using an image feature value of each of segment images obtained by dividing each of the sample images into M parts to generate M part-based multi-class classifiers each configured to output a K-dimensional score vector corresponding to the input image.

8. A non-transitory computer-readable medium including computer program instructions, which when executed by an information processing apparatus, cause the information processing apparatus to perform a method comprising:

performing Adaptive Boosting Error Correcting Output Coding learning using image feature values of a plurality of sample images each being assigned a class label to generate a multi-class classifier configured to output a multi-dimensional score vector corresponding to an input image;

inputting a register image to the multi-class classifier, and registering a multi-dimensional score vector corresponding to the input register image in association with identification information about the register image; and inputting an identification image to be identified to the multi-class classifier, and determining a similarity between a multi-dimensional score vector corresponding to the input identification image and the registered multi-dimensional score vector corresponding to the register image, wherein the performing Adaptive Boosting Error Correcting Output Coding learning includes using image feature values of a plurality of sample images each being assigned one of K class labels to generate an entire-image multi-class classifier configured to output a K-dimensional score vector corresponding to an input image, and performing independent Adaptive Boosting Error Correcting Output Coding learning using an image feature value of each of segment images obtained by dividing each of the sample images into M parts to generate M part-based multi-class classifiers each configured to output a K-dimensional score vector corresponding to the input image.

9. An information processing apparatus comprising:

a learning unit configured to perform Adaptive Boosting Error Correcting Output Coding learning using image feature values of a plurality of sample images each being assigned a class label to generate a multi-class classifier configured to output a multi-dimensional score vector corresponding to an input image;

a registration unit configured to input a register image to the multi-class classifier, and to register a multi-dimensional score vector corresponding to the input register image in association with identification information about the register image; and a determination unit configured to input an identification image to be identified to the multi-class classifier, and to determine a similarity between a multi-dimensional score vector corresponding to the input identification image and the registered multi-dimensional score vector corresponding to the register image, wherein the learning unit performs Adaptive Boosting Error Correcting Output Coding learning using image feature values of a plurality of sample images each being assigned one of K class labels to generate an entire-image multi-class classifier configured to output a K-dimensional score vector corresponding to an input image, and performs independent Adaptive Boosting Error Correcting Output Coding learning using an image feature value of each of segment images obtained by dividing each of the sample images into M parts to generate M part-based multi-class classifiers each configured to output a K-dimensional score vector corresponding to the input image.

* * * * *